(12) United States Patent
Lee et al.

(10) Patent No.: US 12,267,523 B2
(45) Date of Patent: *Apr. 1, 2025

(54) ENCODING METHOD AND APPARATUS THEREFOR, AND DECODING METHOD AND APPARATUS THEREFOR

(71) Applicant: SAMSUNG ELECTRONICS CO., LTD., Suwon-si (KR)

(72) Inventors: Jin-Young Lee, Suwon-si (KR); Yin-Ji Piao, Yongin-si (KR); Elena Alshina, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 187 days.

This patent is subject to a terminal disclaimer.

(21) Appl. No.: 17/896,608

(22) Filed: Aug. 26, 2022

(65) Prior Publication Data

US 2022/0417553 A1 Dec. 29, 2022

Related U.S. Application Data

(63) Continuation of application No. 16/648,510, filed as application No. PCT/KR2018/011476 on Sep. 28, 2018, now Pat. No. 11,432,003.

(Continued)

(51) Int. Cl.
*H04N 19/53* (2014.01)
*H04N 19/13* (2014.01)
(Continued)

(52) U.S. Cl.
CPC ............ *H04N 19/53* (2014.11); *H04N 19/13* (2014.11); *H04N 19/176* (2014.11); *H04N 19/184* (2014.11); *H04N 19/52* (2014.11)

(58) Field of Classification Search
CPC ...... H04N 19/53; H04N 19/13; H04N 19/176; H04N 19/184; H04N 19/52; H04N 19/105; H04N 19/119; H04N 19/129
See application file for complete search history.

(56) References Cited

U.S. PATENT DOCUMENTS 8,233,542 B2 7/2012 Suzuki
9,924,182 B2 3/2018 Park et al.
(Continued)

FOREIGN PATENT DOCUMENTS

CN 1550110 A 11/2004
CN 103313052 A 9/2013
(Continued)

OTHER PUBLICATIONS

Korean Office Action, dated Dec. 13, 2022, issued by the Korean Patent Office, Application No. 10-2022-7040933.
(Continued)

*Primary Examiner* — Shadan E Haghani
(74) *Attorney, Agent, or Firm* — Sughrue Mion, PLLC

(57) ABSTRACT

Provided is a video decoding method including: obtaining, from a bitstream, prediction motion vector information indicating a prediction motion vector of a current block and difference motion vector information indicating a difference motion vector of the current block; determining the prediction motion vector of the current block according to whether or not an adjacent block of the current block is decoded and the prediction motion vector information; determining a motion vector resolution of the current block according to whether or not the adjacent block of the current block is decoded; determining the difference motion vector of the current block according to the difference motion vector information; determining a motion vector of the current block according to the prediction motion vector, the motion vector resolution, and the difference motion vector; and
(Continued)

reconstructing the current block according to the motion vector of the current block, wherein the adjacent block of the current block includes a right block of the current block.

3 Claims, 28 Drawing Sheets

Related U.S. Application Data

(60) Provisional application No. 62/564,621, filed on Sep. 28, 2017.

(51) Int. Cl.
   *H04N 19/176* (2014.01)
   *H04N 19/184* (2014.01)
   *H04N 19/52* (2014.01)

(56) References Cited

U.S. PATENT DOCUMENTS

| | | |
|---|---|---|
| 10,045,048 B2 | 8/2018 | Nam et al. |
| 10,225,565 B2 | 3/2019 | Lee et al. |
| 10,531,113 B2 | 1/2020 | Lee et al. |
| 10,602,179 B2 | 3/2020 | Jeong et al. |
| 10,659,785 B2 | 5/2020 | Galpin et al. |
| 10,979,732 B2 | 4/2021 | Chen et al. |
| 2012/0057632 A1 | 3/2012 | Sato |
| 2012/0207220 A1 | 8/2012 | Kim et al. |
| 2012/0243614 A1* | 9/2012 | Hong ............... H04N 19/52 375/E7.026 |
| 2013/0294518 A1 | 11/2013 | Lim et al. |
| 2014/0015922 A1 | 1/2014 | Zhang |
| 2015/0023424 A1 | 1/2015 | Lim et al. |
| 2015/0110178 A1 | 4/2015 | Kim et al. |
| 2016/0337661 A1 | 11/2016 | Pang et al. |
| 2016/0337662 A1 | 11/2016 | Pang et al. |
| 2017/0347104 A1 | 11/2017 | Tanizawa et al. |
| 2018/0077417 A1* | 3/2018 | Huang ............... H04N 19/70 |
| 2018/0139448 A1 | 5/2018 | Lee et al. |
| 2018/0242011 A1 | 8/2018 | Kim et al. |
| 2018/0316934 A1* | 11/2018 | Nam ............... H04N 19/46 |
| 2019/0342576 A1 | 11/2019 | Park et al. |
| 2019/0349600 A1 | 11/2019 | Sasai et al. |
| 2020/0084469 A1 | 3/2020 | Lee et al. |

FOREIGN PATENT DOCUMENTS

| | | | |
|---|---|---|---|
| CN | 105532004 A | 4/2016 | |
| EP | 1 469 682 A1 | 10/2004 | |
| EP | 2 405 659 A1 | 1/2012 | |
| EP | 3 059 968 A1 | 8/2016 | |
| EP | 3203743 A1 | 8/2017 | |
| EP | 3 410 710 A1 | 12/2018 | |
| KR | 10-2011-0020211 A | 3/2011 | |
| KR | 10-2012-0080552 A | 7/2012 | |
| KR | 10-2014-0022009 A | 2/2014 | |
| KR | 1020140032930 A | 3/2014 | |
| KR | 1020150092054 A | 8/2015 | |
| KR | 1020170078672 A | 7/2017 | |
| KR | 1020170078673 A | 7/2017 | |
| WO | 2010/029850 A1 | 3/2010 | |
| WO | 2013/057782 A1 | 4/2013 | |
| WO | 2015/057038 A1 | 4/2015 | |
| WO | WO-2016068674 A1 * | 5/2016 | ........... H04N 19/139 |
| WO | 2017090967 A1 | 6/2017 | |

OTHER PUBLICATIONS

Indian Office Action, dated Jan. 2, 2023, issued by the Intellectual Property India, Application No. 202128039652.
Indian Office Action, dated Jan. 3, 2023, issued by the Intellectual Property India, Application No. 202128039662.
Office Action dated Mar. 16, 2023, issued by United States Patent and Trademark Office for U.S. Appl. No. 17/717,806.
Hearing Notice dated Mar. 31, 2023, issued by Indian Patent Office for Indian Application No. 202027003973.
Office Action dated May 22, 2023, issued by European Patent Office for European Application No. 18861200.6.
Chen et al., "Algorithm Description of Joint Exploration Test Model 3," Joint Video Exploration Team (JVET) of ITU-T SG 16 WP 3 and ISO/IEC JTC 1/SC 29/WG 11, 3rd Meeting: Geneva, Switzerland, May 26-Jun. 1, 2016, Document: JVET-C1001_v3, (37 pages).
International Search Report (PCT/ISA/210) dated Aug. 17, 2018 issued by the International Searching Authority in International Application No. PCT/KR2018/003800.
Zhou et al., "RCE1: Subtest 1—Motion Vector Resolution Control," Joint Collaborative Team on Video Coding (JCT-VC) of ITU-T SG 16 WP 3 and ISO/IEC JTC 1/SC 29/WG 11, 17th Meeting: Valencia, Spain, Mar. 27-Apr. 4, 2014, Document: JCTVC-Q0155 r1, (5 pages).
Li et al., "RCE1.2: Adaptive MV Precision," Joint Collaborative Team on Video Coding (JCT-VC) of ITU-T SG 16 WP 3 and ISO/IEC JTC 1/SC 29/WG 11, 17th Meeting: Valencia, Spain, Mar. 27-Apr. 4, 2014, Document: JCTVC-Q0049, (4 pages).
Laroche et al., "Non-RCE1: On MV resolution and motion vector predictor number," Joint Collaborative Team on Video Coding (JCT-VC) of ITU-T SG 16 WP 3 and ISO/IEC JTC 1/SC 29/WG 11, 17th Meeting: Valencia, Spain, Mar. 27-Apr. 4, 2014, Document: JCTVC-Q0067, (5 pages).
Chen et al., "EE4: Enhanced Motion Vector Difference Coding," Joint Video Exploration Team (JVET) of ITU-T SG 16 WP 3 and ISO/IEC JTC 1/SC 29/WG 11, 5th Meeting: Geneva, Switzerland, Jan. 12-Jan. 20, 2017, Document: JVET-E0076, (4 pages).
Communication issued Feb. 4, 2021 by the European Patent Office in corresponding European Application No. 18 828 567.0.
Communication issued May 21, 2021 by the Korean Intellectual Property Office in counterpart Korean Patent Application No. 10-2020-7004582.
Communication issued May 19, 2021 by the Intellectual Property Office of India in counterpart Indian Patent Application No. 202027003973.
Communication issued Mar. 30, 2021 by European Patent Office in corresponding European Application No. 18861200.6.
Tabatabai et al., "Tool Experiment 6: Intra Prediction Improvement," Joint Collaborative Team on Video Coding (JCT-VC), of ITU-T SG16 WP3 and ISO/IEC JTC1/SC29/WG11, 2nd Meeting: Geneva, Switzerland, Jul. 21-Jul. 30, 2010, Document: JCTVC-B306, XP030233232, (11 pages).
Communication issued Feb. 18, 2020 by the European Patent Office in corresponding European Application No. 18828567.0.
Communication dated Jun. 19, 2020 by the Korean Intellectual Property Office in corresponding Korean Application No. 10-2019-7037061.
Communication dated Nov. 23, 2021 issued by the Indian Patent Office in counterpart Indian Application No. 202128049713.
Communication dated Nov. 24, 2021 issued by the Indian Patent Office in counterpart Indian Application No. 202128049716.
Written Opinion (PCT/ISA/237) dated Feb. 1, 2019 from the International Searching Authority in counterpart application No. PCT/KR2018/011476.
International Search Report (PCT/ISA/210) dated Feb. 1, 2019 from the International Searching Authority in counterpart application No. PCT/KR2018/011476.
Communication dated Mar. 7, 2022 issued by the Korean Intellectual Property Office in corresponding Korean Application No. 10-2022-77004659.
Communication dated Mar. 31, 2022 issued by the State Intellectual Property Office of the P.R. China in application No. 201880045543.1.
Wien Mathias: "Chapter 7: Inter Prediction" In: "High Efficiency Video Coding—Coding Tools and Specification", Oct. 8, 2014 (Oct. 8, 2014), Springer-Verlag, Berlin Heidelberg, XP093030080, ISBN: 3662442752, pp. 179-203, DOI: 10.1007/978-3-662-44276-0.(27 Pages).

(56) References Cited

OTHER PUBLICATIONS

Communication dated Jul. 14, 2023 issued by the European Patent Office in counterpart European Application No. 18828567.0.
Non-Final Office Action dated Sep. 29, 2023 issued by the USPTO in U.S. Appl. No. 17/717,806.
Chinese Office Action dated Dec. 8, 2023 issued by the Intellectual Property Office of PR China in Application No. 201880063025.2.
Communication issued Mar. 31, 2023 by the Intellectual Property Office of India in counterpart Indian Patent application No. 202027003973.
Communication issued Jan. 22, 2024 by the United States Patent and Trademark Office in U.S. Appl. No. 17/717,806.
Communication issued Feb. 26, 2024 by the European Patent Office in European Patent Application No. 18861200.6.
Second Office Action issued on May 17, 2024 by the Chinese Patent Office in corresponding CN Patent Application No. 201880063025.2.
Communication dated Dec. 12, 2024, issued by the United States Patent and Trademark Office in U.S. Appl. No. 18/647,201.
Communication dated Jan. 29, 2025, issued by the European Patent Office in European Application No. 18861200.6.
Communication dated Feb. 11, 2025, issued by the European Patent Office in European Application No. 18861200.6.
Communication dated Feb. 14, 2025 issued by the Intellectual Property India in Indian Patent Application No. 202027011835.

\* cited by examiner

FIG. 4
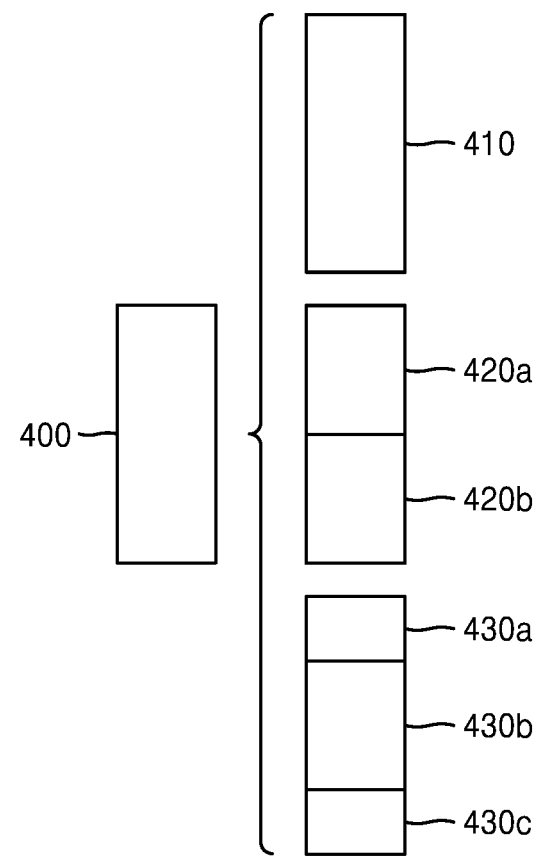
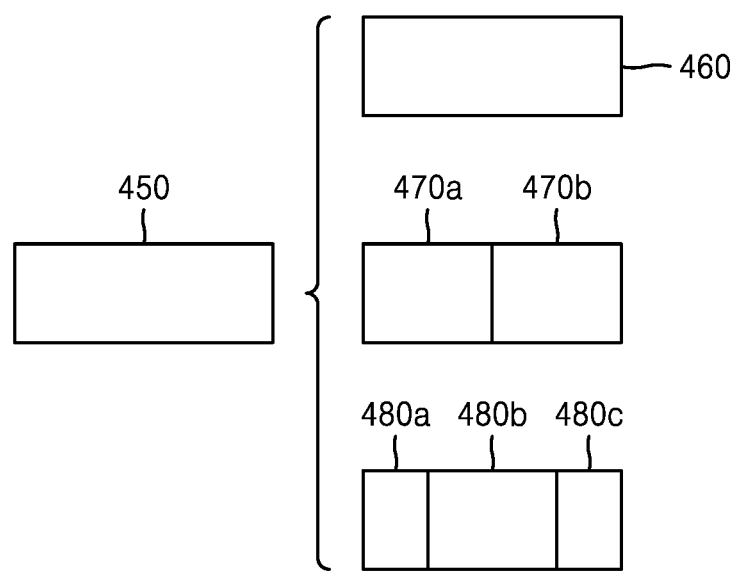

FIG. 13

| BLOCK SHAPE<br>DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 22
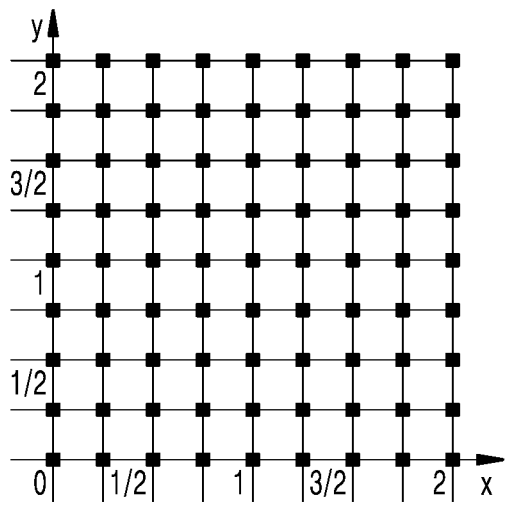
(2210)
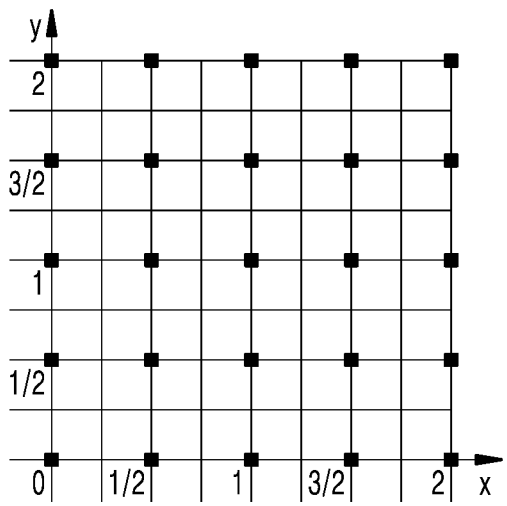
(2220)
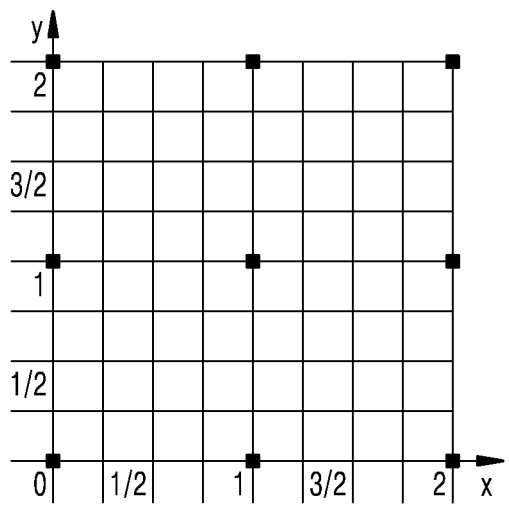
(2230)
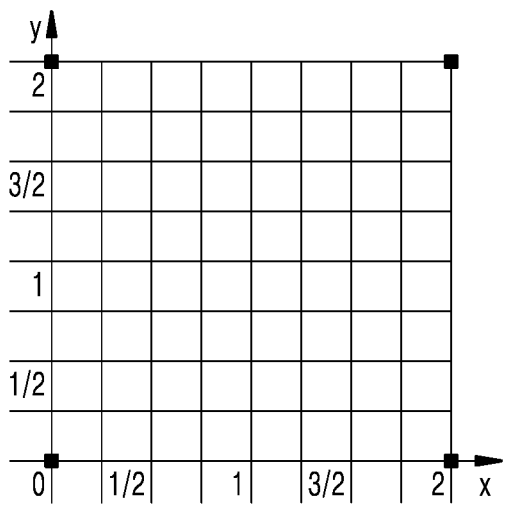
(2240)

ENCODING METHOD AND APPARATUS THEREFOR, AND DECODING METHOD AND APPARATUS THEREFOR

CROSS-REFERENCE TO RELATED APPLICATIONS

This is a continuation application of U.S. application Ser. No. 16/648,510, filed Mar. 18, 2020, which is a National Stage of International Application of PCT/KR2018/011476 filed Sep. 28, 2018, claiming priority based on U.S. Provisional Application No. 62/564,621 filed on Sep. 28, 2017, the contents of all of which are incorporated herein by reference in their entireties.

TECHNICAL FIELD

The present disclosure relates to a video encoding method and a video decoding method, and more particularly, to encoding/decoding methods and apparatuses for optimizing encoding/decoding efficiency by determining orders of encoding/decoding of an image.

BACKGROUND ART

A video of high image quality requires a large amount of data for encoding. However, there is a limited bandwidth permitted to transmit video data, and thus, data rates that are applied when transmitting video data may be restricted. Thus, for efficient transmission of video data, methods of encoding and decoding video data are required, whereby deterioration of image quality is minimized, while a compression rate is increased.

Video data may be compressed by removing spatial redundancy and temporal redundancy between pixels. Pixels adjacent to each other generally have common characteristics, and thus, in order to remove redundancy between adjacent pixels, encoding information is transmitted in a data unit including pixels.

Pixel values of the pixels included in the data unit are not directly transmitted and a method required for obtaining the pixel values is transmitted. A prediction method for predicting a pixel value to be similar as an original value is determined for each data unit and encoding information with respect to the prediction method is transmitted from an encoder to a decoder. Also, because a prediction value is not entirely the same as an original value, residual data about a difference between the original value and the prediction value is transmitted from the encoder to the decoder.

As prediction becomes more accurate, encoding information required for specifying a prediction method is increased, but a size of residual data is decreased. Thus, the prediction method is determined by taking into account the encoding information and the size of the residual data. In particular, data units split from a picture have various sizes, and as sizes of the data units are increased, it is highly probable that prediction has reduced accuracy, but encoding information is decreased. Thus, a size of a block is determined in correspondence to characteristics of the picture.

Also, prediction methods are divided into intra prediction and inter prediction. Intra prediction is a method of predicting pixels of a block from peripheral pixels of the block. Inter prediction is a method of predicting pixels by referring to pixels of another picture, which are referred to by a picture including a block. Thus, intra prediction removes spatial redundancy and inter prediction removes temporal redundancy.

As the number of prediction methods is increased, the amount of encoding information for indicating the prediction methods is increased. Thus, the encoding information may be reduced likewise by predicting the encoding information applied to a block from another block.

A loss of video data is allowed within a limitation for not allowing recognition by human sight, and thus, the amount of residual data may be reduced by performing lossy compression on the residual data in transform and quantization processes.

DESCRIPTION OF EMBODIMENTS

Technical Problem

Provided is a video encoding method for determining a motion vector resolution of a current block according to an encoding order of the current block, whether or not an adjacent block is decoded, etc. Also, provided is a video decoding method for determining a motion vector resolution of a current block according to an encoding order of the current block, whether or not an adjacent block is decoded, etc. Also, provided is a computer-readable recording medium having recorded thereon a program for executing a video encoding method and a video decoding method on a computer, according to an embodiment of the present disclosure.

Solution to Problem

Provided is a video decoding method including: obtaining, from a bitstream, prediction motion vector information indicating a prediction motion vector of a current block and difference motion vector information indicating a difference motion vector of the current block; determining the prediction motion vector of the current block according to whether or not an adjacent block of the current block is decoded and the prediction motion vector information; determining a motion vector resolution of the current block according to whether or not the adjacent block of the current block is decoded; determining the difference motion vector of the current block according to the difference motion vector information; determining a motion vector of the current block according to the prediction motion vector, the motion vector resolution, and the difference motion vector; and reconstructing the current block according to the motion vector of the current block, wherein the adjacent block of the current block includes a right block of the current block.

Provided is a video decoding apparatus including a processor configured to: obtain, from a bitstream, prediction motion vector information indicating a prediction motion vector of a current block and difference motion vector information indicating a difference motion vector of the current block; determine the prediction motion vector of the current block according to whether or not an adjacent block of the current block is decoded and the prediction motion vector information; determine a motion vector resolution of the current block according to whether or not the adjacent block of the current block is decoded; determine the difference motion vector of the current block according to the difference motion vector information; determine a motion vector of the current block according to the prediction motion vector, the motion vector resolution, and the difference motion vector; and reconstruct the current block according to the motion vector of the current block, wherein the adjacent block of the current block includes a right block of the current block.

Provided is a video encoding method including: determining a motion vector of a current block; determining a prediction motion vector of the current block from an adjacent block of the current block; determining a motion vector resolution of the current block according to whether or not the adjacent block of the current block is encoded; determining a difference motion vector of the current block according to a difference between the motion vector and the prediction motion vector of the current block, and the motion vector resolution of the current block; and outputting a bitstream including prediction motion vector information indicating the prediction motion vector of the current block and difference motion vector information indicating the difference motion vector of the current block, wherein the adjacent block of the current block includes a right block of the current block.

Provided is a video encoding apparatus including a processor configured to: determine a motion vector of a current block; determine a prediction motion vector of the current block from an adjacent block of the current block; determine a motion vector resolution of the current block according to whether or not the adjacent block of the current block is encoded; determine a difference motion vector of the current block according to a difference between the motion vector and the prediction motion vector of the current block, and the motion vector resolution of the current block; and output a bitstream including prediction motion vector information indicating the prediction motion vector of the current block and difference motion vector information indicating the difference motion vector of the current block, wherein the adjacent block of the current block includes a right block of the current block.

Provided is a non-transitory recording medium having recorded thereon a program for executing the video encoding method and the video decoding method on a computer.

Technical objectives of the present embodiment are not limited to the technical objectives described above, and other technical objectives may be derived from embodiments described hereinafter.

Advantageous Effects of Disclosure

A compression rate of information about a motion vector resolution of a current block may be improved by determining the motion vector resolution of the current block according to whether or not a block adjacent to the current block is decoded.

BRIEF DESCRIPTION OF DRAWINGS

FIG. 4 illustrates a process, performed by an image decoding apparatus, of determining at least one coding unit by splitting a non-square coding unit, according to an embodiment.

FIG. 13 illustrates a process of determining a depth of a coding unit as a shape and size of the coding unit change, when the coding unit is recursively split such that a plurality of coding units are determined, according to an embodiment.

FIG. 22 illustrates a motion vector resolution in an adaptive motion vector resolution (AMVR) mode.

BEST MODE

Figure 1:
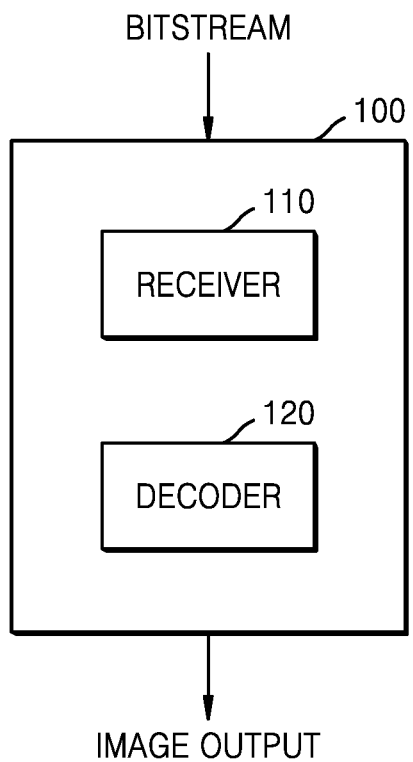
FIG. 1 is a schematic block diagram of an image decoding apparatus according to an embodiment.

Provided is a video decoding method including: obtaining, from a bitstream, prediction motion vector information indicating a prediction motion vector of a current block and difference motion vector information indicating a difference motion vector of the current block; determining the prediction motion vector of the current block according to whether or not an adjacent block of the current block is decoded and the prediction motion vector information; determining a motion vector resolution of the current block according to whether or not the adjacent block of the current block is decoded; determining the difference motion vector of the current block according to the difference motion vector information; determining a motion vector of the current block according to the prediction motion vector, the motion vector resolution, and the difference motion vector; and reconstructing the current block according to the motion vector of the current block, wherein the adjacent block of the current block includes a right block of the current block.

Mode of Disclosure

The advantages and features of the disclosure and methods of achieving the advantages and features will become more apparent by referring to embodiments to be described below with reference to the accompanying drawings. The disclosure, however, may be embodied in many different forms and should not be construed as being limited to the embodiments set forth herein; rather these embodiments are provided so that this disclosure will be thorough and complete, and will fully convey the concept of the disclosure to one of ordinary skill in the art.

Terms used in this specification will be briefly described and the disclosure will be described in detail.

The terms used in the disclosure are selected as general terms as possible, which are currently widely used, in consideration of their functions in the disclosure. However, the terms may be changed according to intentions of technicians in the related art, precedents, or the advent of new technologies. Also, some of the terms used herein may be arbitrarily chosen by the applicant. In this case, these terms are defined in detail below in the detailed description. Thus, the terms used herein should be understood based on the unique meanings thereof and the whole context of the disclosure.

As used herein, the singular forms "a," "an" and "the" are intended to include the plural forms as well, unless the context clearly indicates otherwise.

Throughout the specification, it will be further understood that when a part "includes" or "comprises" an element, unless otherwise defined, the part may further include other elements, not excluding the other elements.

Also, the term "unit" used in the specification may denote software, or a hardware component, such as FPGA or ASIC, and may perform certain functions. However, the "unit" is not limited to software or hardware. The "unit" may be configured to be included in a storage medium which may perform addressing, or may be configured to reproduce one or more processors. Thus, for example, the "unit" may include software components, object-oriented software components, class components and task components, processors, functions, attributes, procedures, sub-routines, segments of program codes, drivers, firmware, micro codes, circuits, data, databases, data structures, tables, arrays, and variables. Functions provided by the components and the "units" may be integrated into a smaller number of components and the "units," or may further be separated into additional components and the "units."

According to an embodiment of the present disclosure, a "unit" may be realized as a processor and a memory. The term "processor" should be broadly interpreted to include a general-purpose processor, a central processing unit (CPU), a microprocessor, a digital signal processor (DSP), a controller, a microcontroller, a state machine, etc. In some environments, a "processor" may refer to an application-specific integrated circuit (ASIC), a programmable logic device (PLD), a field programmable gate array (FPGA), etc. The term "processor" may refer to, for example, combinations of processing devices, such as a combination of a DSP and a microprocessor, a combination of a plurality of microprocessors, a combination of one or more processors integrated with a DSP core, or a combination of certain other configurations.

The term "memory" should be broadly interpreted to include an electronic component capable of storing electronic information. The term "memory" may refer to various types of processor-readable media, such as random access memory (RAM), read-only memory (ROM), non-volatile random access memory (NVRAM), programmable read-only memory (PROM), erasable-programmable read-only memory (EPROM), electrically-erasable programmable read-only memory (EEPROM), flash memory, magnetic or optical data storage device, registers, etc. When a processor is capable of reading information from a memory or recording information in the memory, it is mentioned that the memory is in electronic communication with the processor. A memory integrated in a processor is in electronic communication with the processor.

Hereinafter, an "image" may indicate a static image, such as a still image of a video, or a dynamic image, that is, animated moving image, such as a video.

Hereinafter, a "sample" is data assigned to an image sampling location and may denote data to be processed. For example, pixel values in an image of a spatial domain and transform coefficients on a transform area may be samples. A unit including least one of the samples may be defined as a block.

Hereinafter, embodiments of the disclosure will be described in detail with reference to the accompanying drawings so that one of ordinary skill in the art may easily execute the embodiments. Also, parts not related to the descriptions will be omitted to clearly describe the disclosure.

Hereinafter, by referring to FIGS. 1 through 16, an image encoding apparatus, an image decoding apparatus, an image encoding method, and an image decoding method will be described in detail according to an embodiment. By referring to FIGS. 3 through 16, a method of determining a data unit of an image is described, according to an embodiment.

Hereinafter, by referring to FIGS. 1 and 2, a method and an apparatus for adaptively selecting a context model based on coding units having various shapes are described in detail according to an embodiment of the present disclosure.

FIG. 1 is a schematic block diagram of an image decoding apparatus 100 according to an embodiment.

The image decoding apparatus 100 may include a receiver 110 and a decoder 120. The receiver 110 and the decoder 120 may include at least one processor. Also, the receiver 110 and the decoder 120 may include a memory storing instructions to be executed by the at least one processor.

The receiver 110 may receive a bitstream. The bitstream includes information indicating that an image encoding apparatus 2700 to be described below encodes an image. Also, the bitstream may be transmitted from the image encoding apparatus 2800. The image encoding apparatus 2800 and the image decoding apparatus 100 may be connected to each other in a wired or a wireless manner, and the receiver 110 may receive the bitstream in a wired or a wireless manner. The receiver 110 may receive the bitstream from storage media, such as optical media, hard disks, etc. The decoder 120 may reconstruct an image based on information obtained from the received bitstream. The decoder 120 may obtain a syntax element for reconstructing an image from the bitstream. The decoder 120 may reconstruct the image based on the syntax element.

An operation of the image decoding apparatus 100 is described in more detail with reference to FIG. 2.

Figure 2:
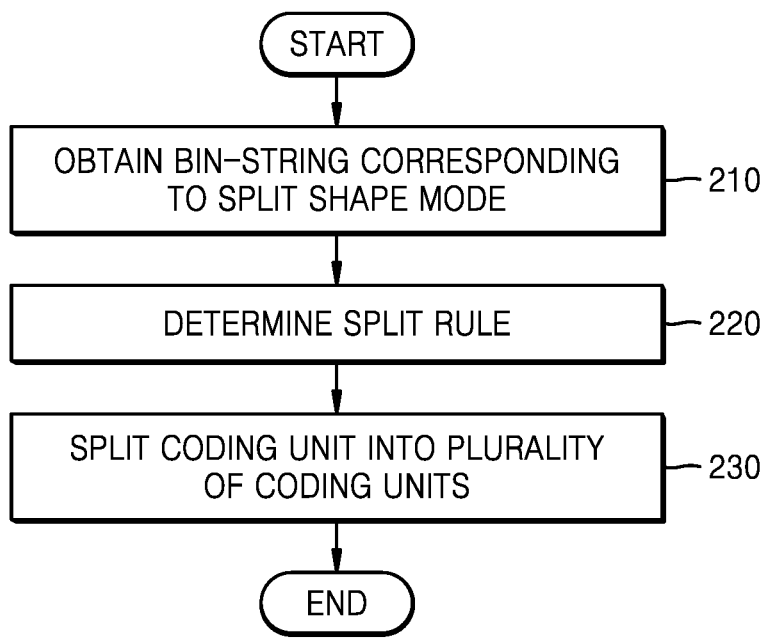
FIG. 2 is a flowchart of an image decoding method according to an embodiment.

FIG. 2 is a flowchart of an image decoding method according to an embodiment.

According to an embodiment of the present disclosure, the receiver 110 may receive a bitstream.

The image decoding apparatus 100 may perform operation 210 of obtaining a bin-string corresponding to a split shape mode of a coding unit from the bit stream. The image decoding apparatus 100 may perform operation 220 of determining a splitting rule of the coding unit. Also, the image decoding apparatus 100 may perform operation 230 of splitting the coding unit into a plurality of coding units, based on at least one of the bin-string corresponding to the split shape mode and the splitting rule. In order to determine the splitting rule, the image decoding apparatus 100 may determine a first permissible range of a size of the coding unit according to a ratio of a width to a height of the coding unit. In order to determine the splitting rule, the image decoding apparatus 100 may determine a second permissible range of a size of the coding according to the split shape mode of the coding unit.

Hereinafter, splitting of the coding unit according to an embodiment of the present disclosure is described in detail.

First, a picture may be split into one or more slices. A slice may be a sequence of at least one coding tree unit (CTU). There is a coding tree block (CTB), as a concept compared to a CTU.

The CTB denotes N×N blocks including N×N samples (N is an integer). Each of color elements may be split into one or more CTBs.

When a picture has three sample arrays (Y, Cr, and Cb component sample arrays), a CTU is a unit including a CTB of a luma sample, two CTBs of chroma samples, the two CTBs corresponding to the CTB of the luma sample, and syntax structures used for encoding the luma sample and the chroma samples. When a picture is a monochrome picture, a CTU is a unit including a CTB of a monochrome sample and syntax structures used for encoding monochrome samples. When a picture is a picture that is encoded into a color plane separated into each color component, a CTU is a unit including syntax structures used for encoding the corresponding picture and samples of the picture.

One CTB may be split into M×N coding blocks including M×N samples (M and N are integers).

When a picture has Y, Cr, and Cb component sample arrays, a coding unit is a unit including a coding block of a luma sample, two coding blocks of chroma samples, the two coding blocks corresponding to the coding block of the luma sample, and syntax structures used for encoding the luma sample and the chroma samples. When a picture is a monochrome picture, a coding unit is a unit including a coding block of a monochrome sample and syntax structures used for encoding monochrome samples. When a picture is a picture that is encoded in a color plane separated into color components, a coding unit is a unit including syntax structures used for encoding the corresponding picture and samples of the picture.

As described above, the CTB and the CTU are different concepts from each other and the coding block and the coding unit are different concepts from each other. That is, a coding unit (CTU) denotes a data structure including a coding block (CTB) including a corresponding sample and a syntax structure corresponding thereto. However, one of ordinary skill in the art may understand that the coding unit (CTU) or the coding block (CTB) refers to a block having a predetermined size and including a predetermined number of samples, and thus, in this specification, the CTB and the CTU or the coding block and the coding unit are non-separately mentioned unless there are particular reasons.

An image may be split into CTUs. A size of the CTUs may be determined based on information obtained from a bitstream. A shape of the CTUs may be a same-sized square. However, it is not limited thereto.

For example, information about a largest size of a luma coding block may be obtained from a bitstream. For example, the largest size of the luma coding block indicated by the information about the largest size of the luma coding block may be one of 4×4, 8×8, 16×16, 32×32, 64×64, 128×128, and 256×256.

For example, information about the largest size of the luma coding block which may be binary-split and information about a luma block size difference may be obtained from the bitstream. The information about the luma block size difference may indicate a size difference between a luma CTU and luma CTB which may be binary-split. Thus, when the information about the largest size of the luma coding block which may be binary-split is combined with the information about the luma block size difference, the information being obtained from the bitstream, a size of the luma CTU may be determined. A size of a chroma CTU may also be determined by using the size of the luma CTU. For example, when a ratio of Y:Cb:Cr is 4:2:0 according to a color format, the size of the chroma block may be half the size of the luma block, and likewise, the size of the chroma CTU may be half the size of the luma CTU.

According to an embodiment, since the information about the largest size of the luma coding block which may be binary-split is obtained from the bitstream, the largest size of the luma coding block which may be binary-split may be variably determined. Unlike this, a largest size of a luma coding block which may be ternary-split may be fixed. For example, a largest size of the luma coding block which may be ternary-split in slice I may be 32×32 and a largest size of the luma coding block which may be ternary-split in slice P or B may be 64×64.

Also, the CTU may be hierarchically split into coding units based on split shape mode information obtained from a bitstream. At least one of information indicating whether or not to perform quad-split, information indicating whether or not to perform multi-split, split direction information, and split type information may be obtained from the bitstream, as the split shape mode information.

For example, the information indicating whether or not to perform quad-split may indicate whether or not to quad-split QUAD_SPLIT a current coding unit.

When the current coding unit is not quad-split, the information indicating whether or not to perform multi-split may indicate whether the current coding unit is not split any more NO_SPLIT or is binary/ternary-split.

When the current coding unit is binary-split or ternary-split, the split direction information indicates that the current coding unit is to be split in one of a horizontal direction and a vertical direction.

When the current coding unit is split in the horizontal direction or the vertical direction, the split type information indicates that the current coding unit is to be binary-split or ternary-split.

According to the split direction information and the split type information, a split mode of the current coding unit may be determined. The split mode when the current coding unit is binary-split in the horizontal direction may be determined as binary horizontal split SPLIT_BT_HOR, the split mode when the current coding unit is ternary-split in the horizontal direction may be determined as ternary horizontal split SPLIT_TT_HOR, the split mode when the current coding unit is binary-split in the vertical direction may be determined as binary vertical split SPLIT_BT_VER, and the split mode when the current coding unit is ternary-split in the vertical direction may be determined as ternary vertical split SPLIT_TT_VER.

The image decoding apparatus 100 may obtain split shape mode information from one bin-string Shapes of the bitstream received by the image decoding apparatus 100 may include a fixed length binary code, a unary code, a truncated unary code, a predetermined binary code, etc. A bin-string is information indicated as a binary digit string. The bin-string may include at least one bit. The image decoding apparatus 100 may obtain the split shape mode information corresponding to the bin-string based on the splitting rule. The image decoding apparatus 100 may determine, based on one bin-string, whether or not to quad-split the coding unit, whether not to split the coding unit, or a split direction and a split type.

The coding unit may be smaller than or equal to the CTU. For example, the CTU is a coding unit having a largest size, and thus, the CTU is also a coding unit. When the split shape mode information about the CTU indicates that splitting is not performed, the coding unit determined from the CTU has the same size as the CTU. When the split shape mode information about the CTU indicates that splitting is performed, the CTU may be split into coding units. Also, when the split shape mode information about the coding unit indicates that splitting is performed, the coding units may be split into smaller-sized coding units. However, the splitting of an image is not limited thereto and the CTU and the coding unit may not be separated from each other. The splitting of the coding unit is described in more detail with reference to FIGS. 3 through 16.

Also, one or more prediction blocks for prediction may be determined from the coding unit. The prediction block may be the same as or smaller than the coding unit. Also, one or more transform blocks for transform may be determined from the coding unit. The transform block may be the same as or smaller than the coding unit.

Shapes and sizes of the transform block and the prediction block may be irrelevant to each other.

According to another embodiment, prediction may be performed by using the coding unit as the prediction block. Also, transform may be performed by using the coding unit as the transform block.

Splitting of the coding unit is described in more detail with reference to FIGS. 3 through 16. A current block and a peripheral block of the present disclosure may indicate one of a CTU, a coding unit, a prediction block, and a transform block. Also, the current block or a current coding unit is a block which is currently decoded or encoded or a block which is currently split. The peripheral block may be a block reconstructed before the current block. The peripheral block may be spatially or temporally adjacent to the current block. The peripheral block may be located at one of a bottom left portion, a left portion, a top left portion, a top portion, a top right portion, a right portion, and a bottom right portion of the current block.

Figure 3:
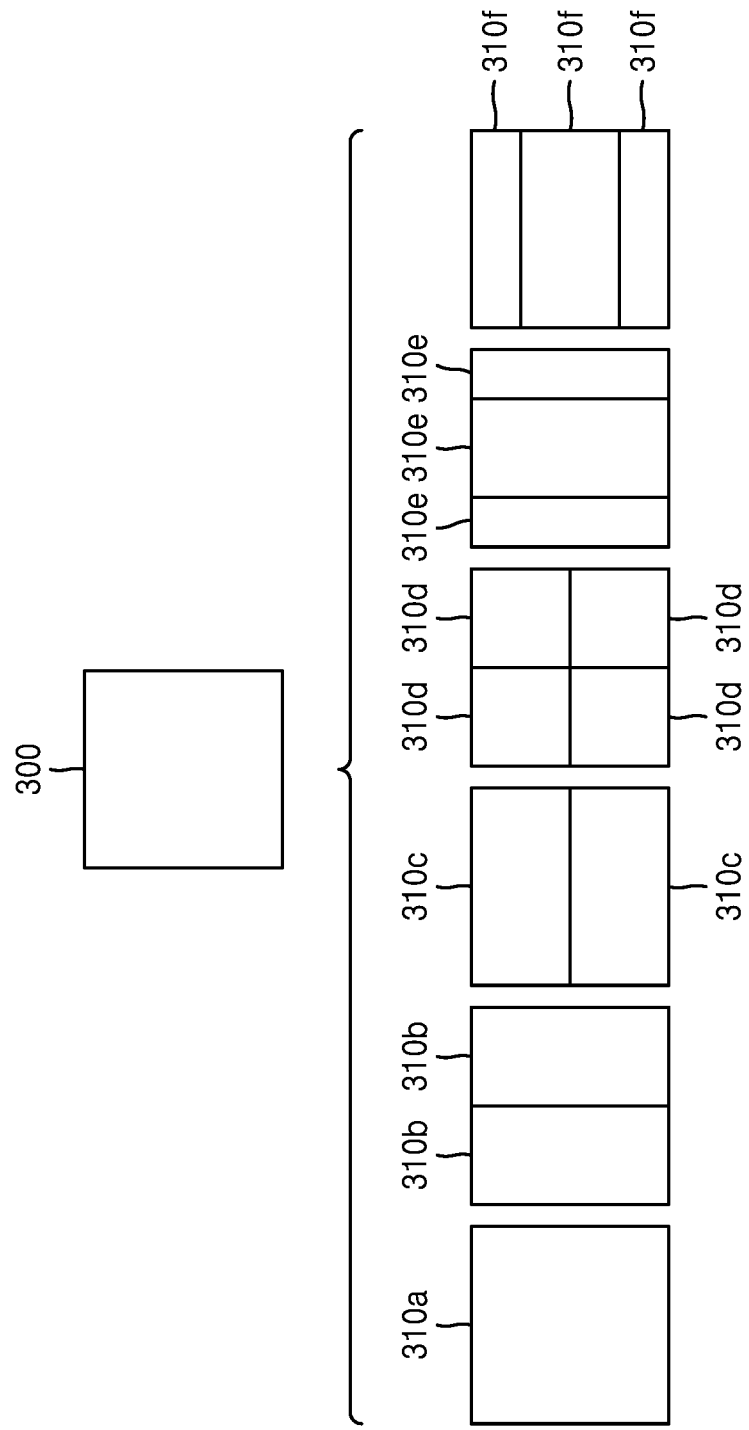
FIG. 3 illustrates a process, performed by an image decoding apparatus, of determining at least one coding unit by splitting a current coding unit, according to an embodiment.

FIG. 3 illustrates a process, performed by the image decoding apparatus 100, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information may be information indicating at least one of a shape, a direction, a ratio of width to height, or a size of the coding unit.

A shape of the coding unit may include a square and a non-square. When the width and the height of the coding unit are the same as each other (that is, when the block shape of the coding unit is 4N×4N), the image decoding apparatus 100 may determine the block shape information of the coding unit as a square. The image decoding apparatus 100 may determine the shape of the coding unit as a non-square.

When the width and the height of the coding unit are different from each other (that is, the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as the non-square. When the shape of the coding unit is the non-square, the image decoding apparatus 100 may determine the ratio of width to height of the block shape information of the coding unit as at least one of 1:2, 2:1, 1:4, 4:1, 1:8, 8:1, 1:16, 16:1, 1:32, and 32:1. Also, based on the width and the height of the coding unit, the image decoding apparatus 100 may determine whether the coding unit is a horizontal direction or a vertical direction. Also, the image decoding apparatus 100 may determine a size of the coding unit, based on at least one of the width, the height, or the breadth of the coding unit.

According to an embodiment, the image decoding apparatus 100 may determine a shape of a coding unit by using block shape information, and may determine a splitting method of the coding unit by using split shape mode information. That is, a coding unit splitting method indicated by the split shape mode information may be determined based on a block shape indicated by the block shape information used by the image decoding apparatus 100.

The image decoding apparatus 100 may obtain the split shape mode information from the bitstream. However, it is not limited thereto and the image decoding apparatus 100 and the image encoding apparatus 2800 may determine predetermined split shape mode information based on the block shape information. The image decoding apparatus 100 may determine the predetermined split shape mode information with respect to a CTU or a minimum coding unit. For example, the image decoding apparatus 100 may determine the split shape mode information as quad-split respect to the CTU. Also, the image decoding apparatus 100 may determine the split shape mode information as "not to split" with respect to the minimum coding unit. In detail, the image decoding apparatus 100 may determine a size of the CTU as 256×256. The image decoding apparatus 100 may determine the predetermined split shape mode information as quad-split. The quad-split is a split shape mode for binary-splitting both of the width and the height of the coding unit. The image decoding apparatus 100 may obtain a coding unit having a size of 128×128 from a CTU having a size of 256×256 based on the split shape mode information. Also, the image decoding apparatus 100 may determine a size of the minimum coding unit as 4×4. The image decoding apparatus 100 may obtain the split shape mode information indicating "not to split" with respect to the minimum coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310a having the same size as the current coding unit 300 is not split, based on the split shape mode information indicating not to perform splitting, or may determine coding units 310b, 310c, 310d, 310e, or 310f split based on the split shape mode information indicating a predetermined splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. The image decoding apparatus 100 may determine three coding units 310e obtained by splitting the current coding unit 300 in a vertical direction, based on the split shape mode information indicating to perform ternary-splitting in a vertical direction, according to an embodiment. The image decoding apparatus 100 may determine three coding units 310f obtained by splitting the current coding unit 300 in a horizontal direction, based on the split shape mode information indicating to perform ternary-splitting in a horizontal direction. However, splitting methods of the square coding unit are not limited to the above-described methods, and the split shape mode information may indicate various methods. Predetermined splitting methods of splitting the square coding unit will be described in detail below in relation to various embodiments.

FIG. 4 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a predetermined splitting method, based on split shape mode information. Referring to FIG. 4, when the block shape information of a current coding unit 400 or 450 indicates a non-square shape, the image decoding apparatus 100 may determine that a coding unit 410 or 460 having the same size as the current coding unit 400 or 450 is not split, based on the split shape mode information indicating not to perform splitting, or determine coding units 420a and 420b, 430a to 430c, 470a and 470b, or 480a to 480c split based on the split shape mode information indicating a predetermined splitting method. Predetermined splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the location of a long side of the non-square current coding unit 400 or 450 may be considered. For example, the image decoding apparatus 100 may determine a plurality of coding units by dividing a long side of the current coding unit 400 or 450, in consideration of the shape of the current coding unit 400 or 450.

According to an embodiment, when the split shape mode information indicates to split (ternary-split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of width to height of the current coding unit 400 or 450 may be 4:1 or 1:4. When the ratio of width to height is 4:1, the width is greater than the height, and thus, the block shape information may be a horizontal direction. When the ratio of width to height is 1:4, the width is less than the height, and thus, the block shape information may be a vertical direction. The image decoding apparatus 100 may determine to split the current coding unit into an odd number of blocks based on the split shape mode information. Also, the image decoding apparatus 100 may determine a split direction of the current coding unit 400 or 450 based on the block shape information of the current coding unit 400 or 450. For example, the current coding unit 400 is a vertical direction, the image decoding apparatus 100 may determine coding units 430a, 430b, and 430c by splitting the current coding unit 400 in a horizontal direction. Also, when the current coding unit 450 is a horizontal direction, the image decoding apparatus 100 may determine coding units 480a, 480b, and 480c by splitting the current coding unit 450 in a vertical direction.

According to an embodiment, the image decoding apparatus 100 may determine an odd number of coding units included in the current coding unit 400 or 450, and not all the determined coding units may have the same size. For example, a predetermined coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into an odd number of blocks, the image decoding apparatus 100 may determine an odd number of coding units included in the current coding unit 400 or 450, and may put a predetermined restriction on at least one coding unit from among the odd number of coding units generated by splitting the current coding unit 400 or 450. Referring to FIG. 4, the image decoding apparatus 100 may allow a decoding method of the coding unit 430b or 480b to be different from that of the other coding units 430a and 430c, or 480a and 480c, wherein the coding unit 430b or 480b is at a center location from among the three coding units 430a, 430b, and 430c, or 480a, 480b, and 480c generated by splitting the current coding unit 400 or 450. For example, the image decoding apparatus 100 may restrict the coding unit 430b or 480b at the center location to be no longer split or to be split only a predetermined number of times, unlike the other coding units 430a and 430c, or 480a and 480c.

Figure 5:
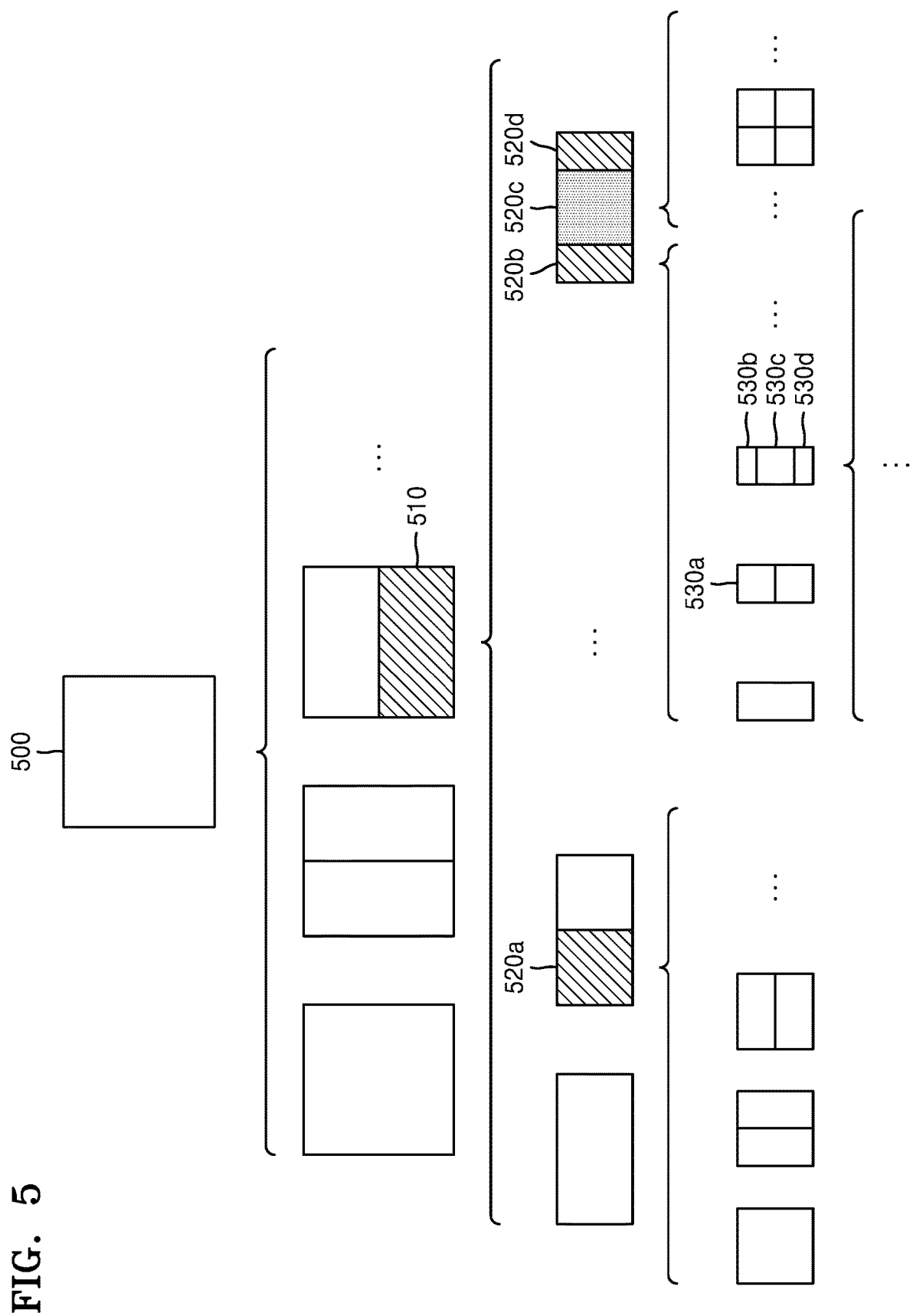
FIG. 5 illustrates a process, performed by an image decoding apparatus, of splitting a coding unit based on at least one of block shape information and split shape mode information, according to an embodiment.

FIG. 5 illustrates a process, performed by the image decoding apparatus 100, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the structure of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may split the non-square second coding unit 510, which is determined by splitting the first coding unit 500, into one or more third coding units 520a, or 520b, 520c, and 520d based on the split shape mode information, or may not the non-square second coding unit 510. The image decoding apparatus 100 may obtain the split shape mode information, and determine a plurality of various-shaped second coding units (e.g., 510) by splitting the first coding unit 500, based on the obtained split shape mode information, and the second coding unit 510 may be split by using the splitting method of the first coding unit 500, based on the split shape mode information. According to an embodiment, when the first coding unit 500 is split into the second coding units 510 based on the split shape mode information of the first coding unit 500, the second coding unit 510 may also be split into the third coding units 520a, or 520b, 520c, and 520d based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a predetermined coding unit from among an odd number of third coding units 520b, 520c, and 520d determined by splitting the non-square second coding unit 510 (e.g., a coding unit or a square coding unit, which is located at a center location may be recursively split. According to an embodiment, the square third coding unit 520c from among the odd number of third coding units 520b, 520c, and 520d may be split in a horizontal direction into a plurality of fourth coding units. A non-square fourth coding unit 530b or 530d from among the plurality of fourth coding units 530a, 530b, 530c, and 530d may be split into a plurality of coding units. For example, the non-square fourth coding unit 530b or 530d may be split into an odd number of coding units. A method that may be used to recursively split a coding unit will be described below in relation to various embodiments.

According to an embodiment, the image decoding apparatus 100 may determine to split each of the third coding units 520a, or 520b, 520c, and 520d into coding units or not to split the second coding unit 510, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520b, 520c, and 520d. The image decoding apparatus 100 may put a predetermined restriction on a predetermined third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a predetermined splitting method (e.g., split into only four coding units or split by using a splitting method of the second coding unit 510), or to be split only a predetermined number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain the split shape mode information, which is used to split a current coding unit, from a predetermined location in the current coding unit.

Figure 6:
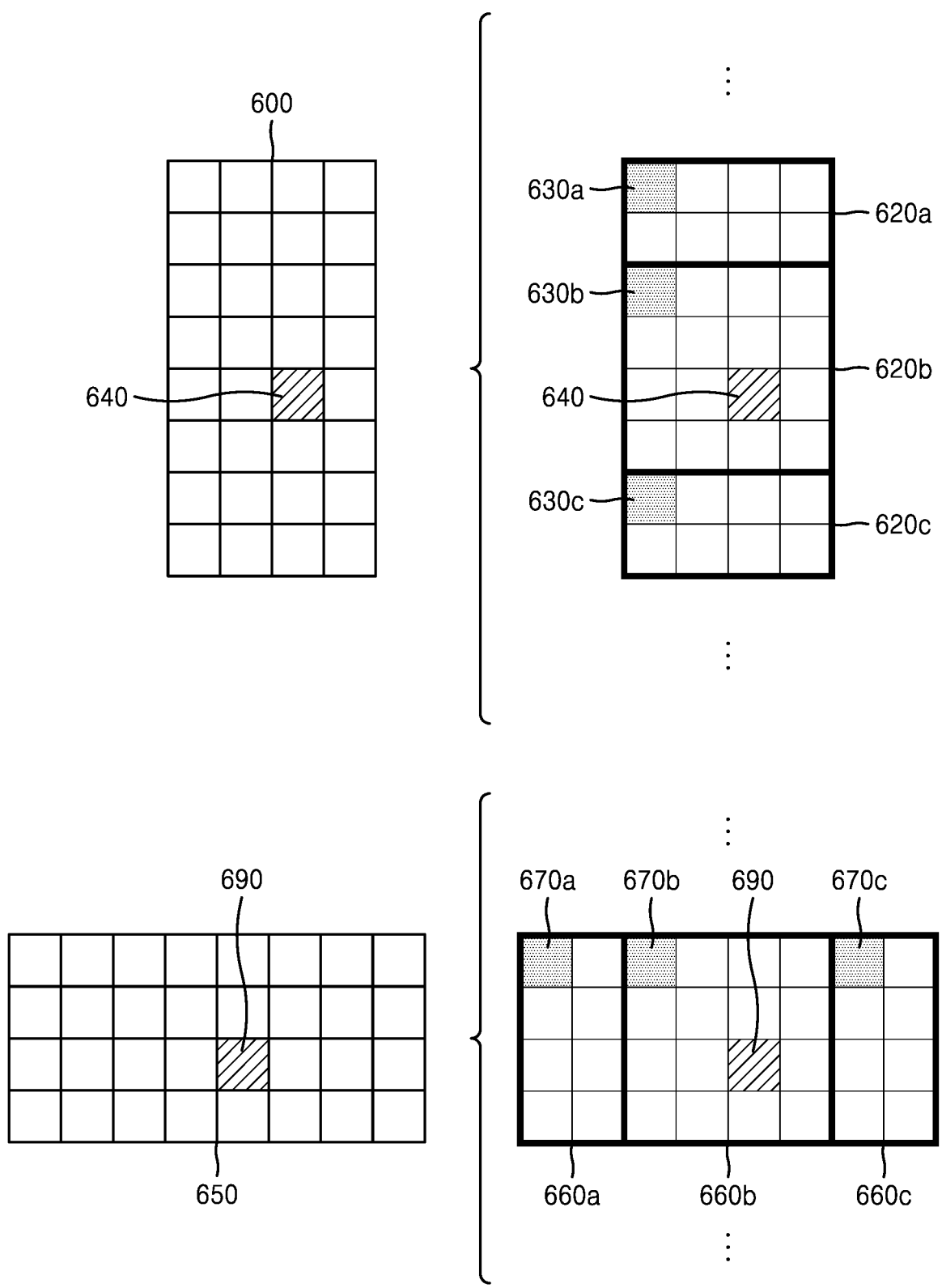
FIG. 6 illustrates a method, performed by an image decoding apparatus, of determining a predetermined coding unit from among an odd number of coding units, according to an embodiment.

FIG. 6 illustrates a method, performed by the image decoding apparatus 100, of determining a predetermined coding unit from among an odd number of coding units, according to an embodiment.

Referring to FIG. 6, split shape mode information of a current coding unit 600 or 650 may be obtained from a sample of a predetermined location from among a plurality of samples included in the current coding unit 600 or 650 (e.g., a sample 640 or 690 of a center location). However, the predetermined location in the current coding unit 600, from which at least one piece of the split shape mode information may be obtained, is not limited to the center location in FIG. 6, and may include various locations included in the current coding unit 600 (e.g., top, bottom, left, right, top left, bottom left, top right, and bottom right locations). The image decoding apparatus 100 may obtain the split shape mode information from the predetermined location and determine to split or not to split the current coding unit into various-shaped and various-sized coding units.

According to an embodiment, when the current coding unit is split into a predetermined number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a predetermined location.

According to an embodiment, the image decoding apparatus 100 may use information indicating locations of the odd number of coding units, to determine a coding unit at a center location from among the odd number of coding units. Referring to FIG. 6, the image decoding apparatus 100 may determine an odd number of coding units 620a, 620b, and 620c or an odd number of coding units 660a, 660b, and 660c by splitting the current coding unit 600. The image decoding apparatus 100 may determine a coding unit 620b at a center location or a coding unit 660b at a center location by using information about locations of the odd number of coding units 620a to 620c or the odd number of coding units 660a to 660c. For example, the image decoding apparatus 100 may determine the coding unit 620b of the center location by determining the locations of the coding units 620a, 620b, and 620c based on information indicating locations of predetermined samples included in the coding units 620a, 620b, and 620c. In detail, the image decoding apparatus 100 may determine the coding unit 620b at the center location by determining the locations of the coding units 620a, 620b, and 620c based on information indicating locations of top left samples 630a, 630b, and 630c of the coding units 620a, 620b, and 620c.

According to an embodiment, the information indicating the locations of the top left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the top left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the top left sample 630a of the upper coding unit 620a may include coordinates (xa, ya), information indicating the location of the top left sample 630b of the middle coding unit 620b may include coordinates (xb, yb), and information indicating the location of the top left sample 630c of the lower coding unit 620c may include coordinates (xc, yc). The image decoding apparatus 100 may determine the middle coding unit 620b by using the coordinates of the top left samples 630a, 630b, and 630c which are included in the coding units 620a, 620b, and 620c, respectively. For example, when the coordinates of the top left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the top left samples 630a, 630b, and 630c may include coordinates indicating absolute locations in the picture, or may use coordinates (dxb, dyb) indicating a relative location of the top left sample 630b of the middle coding unit 620b and coordinates (dxc, dyc) indicating a relative location of the top left sample 630c of the lower coding unit 620c with reference to the location of the top left sample 630a of the upper coding unit 620a. A method of determining a coding unit at a predetermined location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a predetermined criterion. For example, the image decoding apparatus 100 may select the coding unit 620b, which has a size different from that of the others, from among the coding units 620a, 620b, and 620c.

According to an embodiment, the image decoding apparatus 100 may determine the widths or heights of the coding units 620a, 620b, and 620c by using the coordinates (xa, ya) indicating the location of the top left sample 630a of the upper coding unit 620a, the coordinates (xb, yb) indicating the location of the top left sample 630b of the middle coding unit 620b, and the coordinates (xc, yc) indicating the location of the top left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. According to an embodiment, the image decoding apparatus 100 may determine the height of the middle coding unit 620*b* to be yc-yb. According to an embodiment, the image decoding apparatus 100 may determine the width or height of the lower coding unit 620*c* by using the width or height of the current coding unit 600 or the widths or heights of the top and middle coding units 620*a* and 620*b*. The image decoding apparatus 100 may determine a coding unit, which has a size different from that of the others, based on the determined widths and heights of the coding units 620*a* to 620*c*. Referring to FIG. 6, the image decoding apparatus 100 may determine the middle coding unit 620*b*, which has a size different from the size of the upper and lower coding units 620*a* and 620*c*, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding apparatus 100 may determine the widths or the heights of the coding units 660*a*, 660*b*, and 660*c* by using the coordinates (xd, yd) indicating the location of the top left sample 670*a* of the left coding unit 660*a*, the coordinates (xe, ye) indicating the location of the top left sample 670*b* of the middle coding unit 660*b*, and the coordinates (xf, yf) indicating the location of the top left sample 670*c* of the right coding unit 660*c*. The image decoding apparatus 100 may determine the respective sizes of the coding units 660*a*, 660*b*, and 660*c* by using the coordinates (xd, yd), (xe, ye), and (xf, yf) indicating the locations of the coding units 660*a*, 660*b*, and 660*c*.

According to an embodiment, the image decoding apparatus 100 may determine the width of the left coding unit 660*a* to be xe-xd. The image decoding apparatus 100 may determine the height of the left coding unit 660*a* to be the height of the current coding unit 650. According to an embodiment, the image decoding apparatus 100 may determine the width of the middle coding unit 660*b* to be xf-xe. The image decoding apparatus 100 may determine the height of the middle coding unit 660*b* to be the height of the current coding unit 600. According to an embodiment, the image decoding apparatus 100 may determine the width or the height of the right coding unit 660*c* by using the width or the height of the current coding unit 650 and the widths and the heights of the left coding unit 660*a* and the middle coding unit 660*b*. The image decoding apparatus 100 may determine a coding unit, which has a size different from that of the others, based on the determined widths and heights of the coding units 660*a*, 660*b*, and 660*c*. Referring to FIG. 6, the image decoding apparatus 100 may determine the middle coding unit 660*b*, which has a size different from the size of the left coding unit 660*a* and the right coding unit 660*c*, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described top left locations, and information about arbitrary locations of samples included in the coding units may be used.

According to an embodiment, the image decoding apparatus 100 may select a coding unit at a predetermined location from among an odd number of coding units determined by splitting the current coding unit, considering the shape of the current coding unit. For example, when the current coding unit has a non-square shape, a width of which is longer than a height, the image decoding apparatus 100 may determine the coding unit at the predetermined location in a horizontal direction. That is, the image decoding apparatus 100 may determine one of coding units at different locations in a horizontal direction and put a restriction on the coding unit. When the current coding unit has a non-square shape, a height of which is longer than a width, the image decoding apparatus 100 may determine the coding unit at the predetermined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the predetermined location from among the even number of coding units. The image decoding apparatus 100 may determine an even number of coding units by splitting (binary-splitting) the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus 100 may use at least one of block shape information and split shape mode information, which is stored in a sample included in a coding unit at a center location, in a splitting operation to determine the coding unit at the center location from among the plurality of coding units determined by splitting the current coding unit.

Referring to FIG. 6, the image decoding apparatus 100 may split the current coding unit 600 into a plurality of coding units 620*a*, 620*b*, and 620*c* based on the split shape mode information, and may determine a coding unit 620*b* at a center location from among the plurality of the coding units 620*a*, 620*b*, and 620*c*. Furthermore, the image decoding apparatus 100 may determine the coding unit 620*b* at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620*a*, 620*b*, and 620*c* based on the split shape mode information, the coding unit 620*b* including the sample 640 may be determined as the coding unit at the center location. However, information used to determine the coding unit at the center location is not limited to the split shape mode information, and various types of information may be used to determine the coding unit at the center location.

According to an embodiment, predetermined information for identifying the coding unit at the predetermined location may be obtained from a predetermined sample included in a coding unit to be determined. Referring to FIG. 6, the image decoding apparatus 100 may use the split shape mode information, which is obtained from a sample at a predetermined location in the current coding unit 600 (e.g., a sample at a center location of the current coding unit 600) to determine a coding unit at a predetermined location from among the plurality of the coding units 620a, 620b, and 620c determined by splitting the current coding unit 600 (e.g., a coding unit at a center location from among a plurality of split coding units). That is, the image decoding apparatus 100 may determine the sample at the predetermined location by considering a block shape of the current coding unit 600, determine the coding unit 620b including a sample, from which predetermined information (e.g., the split shape mode information) may be obtained, from among the plurality of coding units 620a, 620b, and 620c determined by splitting the current coding unit 600, and may put a predetermined restriction on the coding unit 620b. Referring to FIG. 6, according to an embodiment, the image decoding apparatus 100 may determine the sample 640 at the center location of the current coding unit 600 as the sample from which the predetermined information may be obtained, and may put a predetermined restriction on the coding unit 620b including the sample 640, in a decoding operation. However, the location of the sample from which the predetermined information may be obtained is not limited to the above-described location, and may include arbitrary locations of samples included in the coding unit 620b to be determined for a restriction.

According to an embodiment, the location of the sample from which the predetermined information may be obtained may be determined based on the shape of the current coding unit 600. According to an embodiment, the block shape information may indicate whether the current coding unit has a square or non-square shape, and the location of the sample from which the predetermined information may be obtained may be determined based on the shape. For example, the image decoding apparatus 100 may determine a sample located on a boundary for dividing at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for dividing a long side of the current coding unit in half, as the sample from which the predetermined information may be obtained.

According to an embodiment, when the current coding unit is split into a plurality of coding units, the image decoding apparatus 100 may use the split shape mode information to determine a coding unit at a predetermined location from among the plurality of coding units. According to an embodiment, the image decoding apparatus 100 may obtain the split shape mode information from a sample at a predetermined location in a coding unit, and split the plurality of coding units, which are generated by splitting the current coding unit, by using the split shape mode information, which is obtained from the sample of the predetermined location in each of the plurality of coding units. That is, a coding unit may be recursively split based on the split shape mode information, which is obtained from the sample at the predetermined location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a predetermined block (e.g., the current coding unit).

Figure 7:
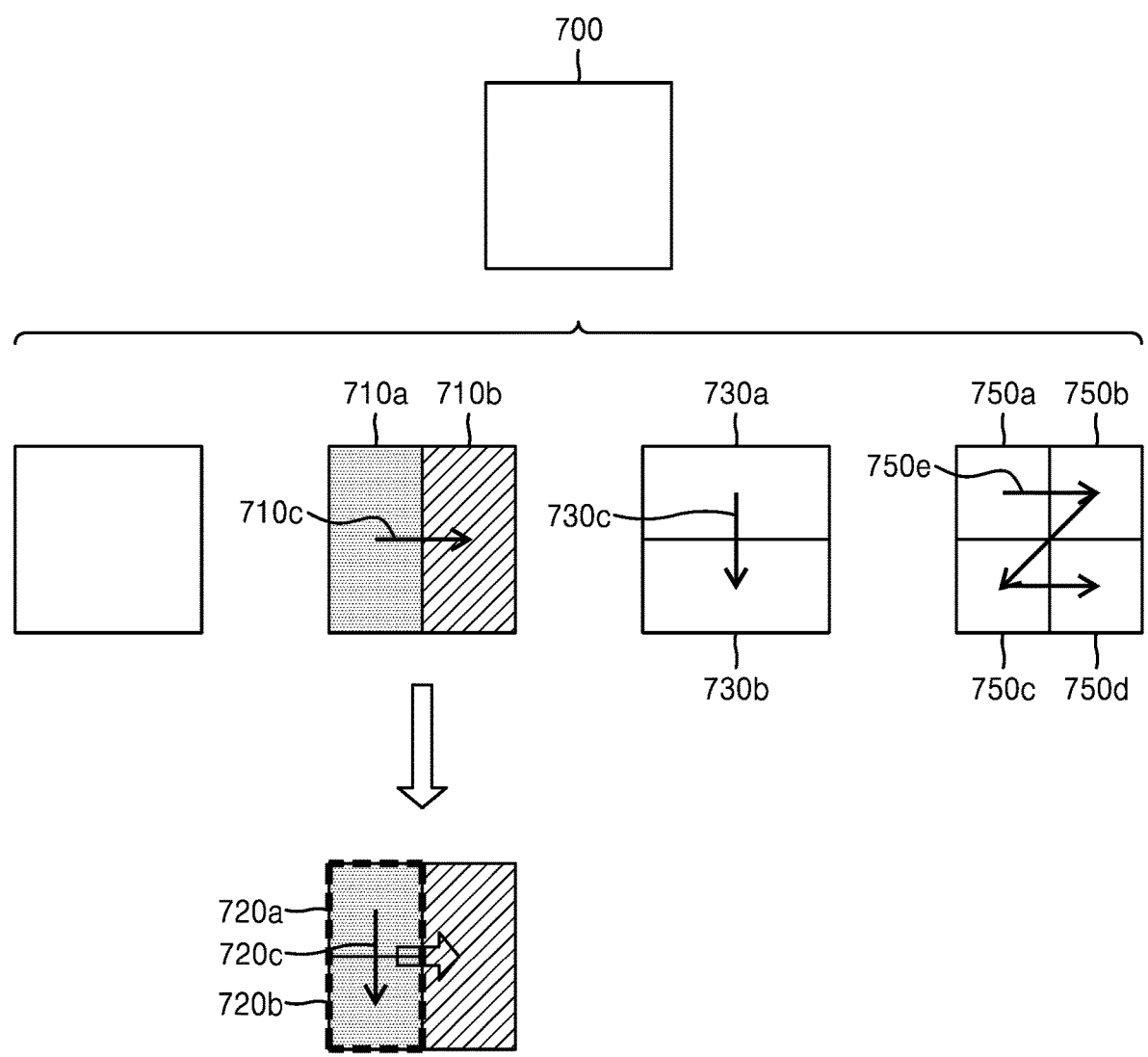
FIG. 7 illustrates an order of processing a plurality of coding units when an image decoding apparatus determines the plurality of coding units by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, determine second coding units 730a and 730b by splitting the first coding unit 700 in a horizontal direction, or determine second coding units 750a to 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine to process the second coding units 750a to 750d, which are determined by splitting the first coding unit 700 in vertical and horizontal directions, according to a predetermined order (e.g., a raster scan order or Z-scan order 750e) by which coding units in a row are processed and then coding units are processed in a next row.

According to an embodiment, the image decoding apparatus 100 may recursively split coding units. Referring to FIG. 7, the image decoding apparatus 100 may determine a plurality of coding units 710a, 710b, 730a, 730b, 750a, 750b, 750c, and 750d by splitting the first coding unit 700, and may recursively split each of the determined plurality of coding units 710a, 710b, 730a, 730b, 750a, 750b, 750c, and 750d. A splitting method of the plurality of coding units 710a, 710b, 730a, 730b, 750a, 750b, 750c, and 750d may correspond to a splitting method of the first coding unit 700. As such, each of the plurality of coding units 710a, 710b, 730a, 730b, 750a, 750b, 750c, and 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a predetermined order.

Figure 8:
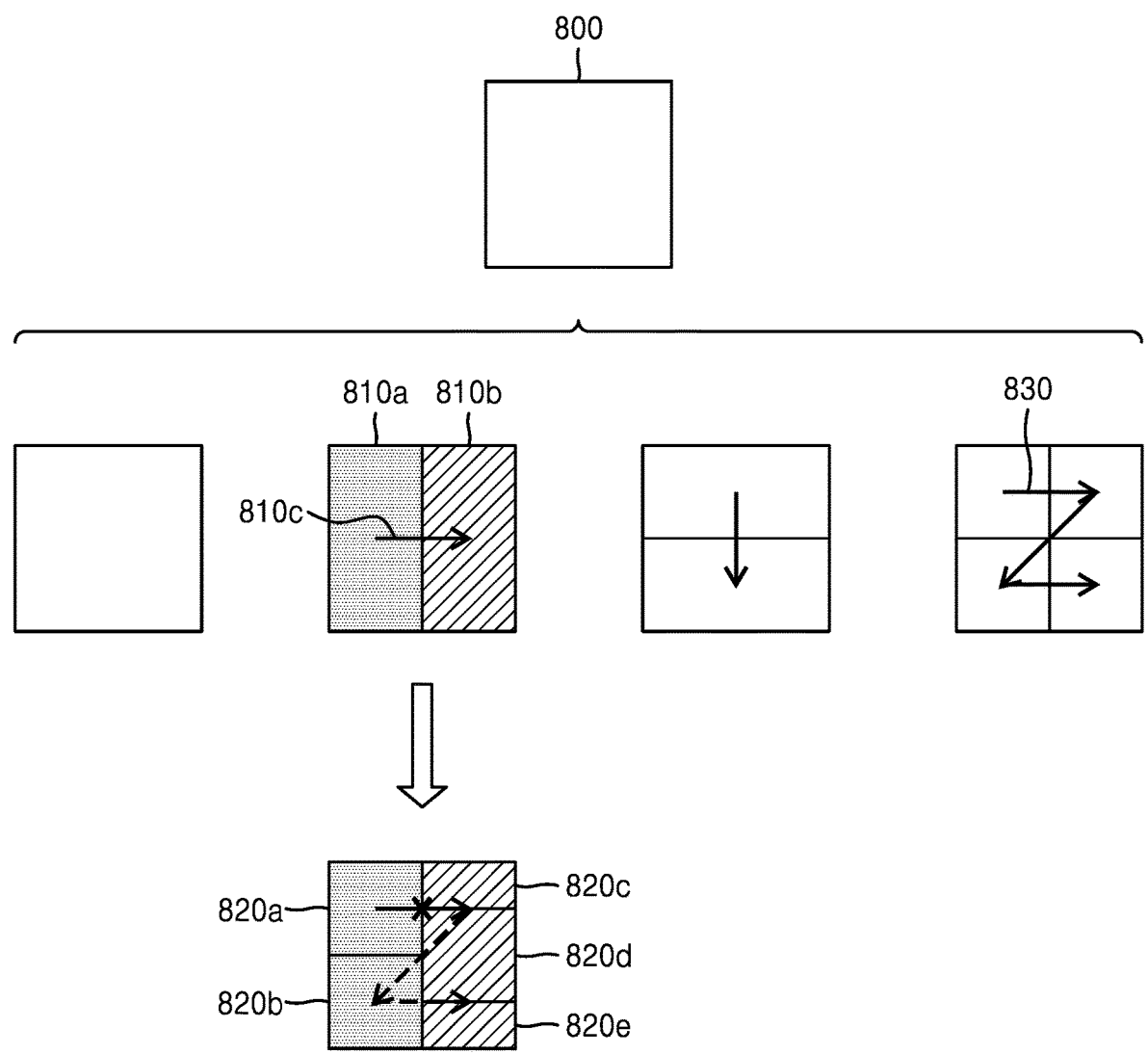
FIG. 8 illustrates a process, performed by an image decoding apparatus, of determining that a current coding unit is to be split into an odd number of coding units, when the coding units are not processable in a predetermined order, according to an embodiment.

FIG. 8 illustrates a process, performed by the image decoding apparatus 100, of determining that a current coding unit is to be split into an odd number of coding units, when the coding units are not processable in a predetermined order, according to an embodiment.

According to an embodiment, the image decoding apparatus 100 may determine whether the current coding unit is split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c to 820e. According to an embodiment, the image decoding apparatus 100 may determine a plurality of third coding units 820a and 820b by splitting the left second coding unit 810a in a horizontal direction, and may split the right second coding unit 810b into an odd number of third coding units 820c to 820e.

According to an embodiment, the image decoding apparatus 100 may determine whether any coding unit is split into an odd number of coding units, by determining whether the third coding units 820a and 820b, and 820c to 820e are processable in a predetermined order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, and the third coding units 820a and 820b, and 820c, 820d, and 820e are split into an odd number of coding units, based on at least one of the block shape information and the split shape mode information. For example, a second coding unit located in the right from among the second coding units 810a and 810b may be split into an odd number of third coding units 820c, 820d, and 820e. A processing order of a plurality of coding units included in the first coding unit 800 may be a predetermined order (e.g., a Z-scan order 830), and the image decoding apparatus 100 may decide whether the third coding units 820c, 820d, and 820e, which are determined by splitting the right second coding unit 810b into an odd number of coding units, satisfy a condition for processing in the predetermined order.

According to an embodiment, the image decoding apparatus 100 may determine whether the third coding units 820a and 820b, and 820c, 820d, and 820e included in the first coding unit 800 satisfy the condition for processing in the predetermined order, and the condition relates to whether at least one of a width and height of the second coding units 810a and 810b is to be divided in half along a boundary of the third coding units 820a and 820b, and 820c, 820d, and 820e. For example, the third coding units 820a and 820b determined by dividing the height of the non-square left second coding unit 810a in half satisfy the condition. Because boundaries of the third coding units 820c, 820d, and 820e determined by splitting the right second coding unit 810b into three coding units do not divide the width or height of the right second coding unit 810b in half, it may be determined that the third coding units 820c, 820d, and 820e do not satisfy the condition. When the condition is not satisfied as described above, the image decoding apparatus 100 may decide disconnection of a scan order, and determine that the right second coding unit 810b is to be split into an odd number of coding units, based on a result of the decision. According to an embodiment, when a coding unit is split into an odd number of coding units, the image decoding apparatus 100 may put a predetermined restriction on a coding unit at a predetermined location among the split coding units. The restriction or the predetermined location has been described above in relation to various embodiments, and thus detailed descriptions thereof will not be provided here.

Figure 9:
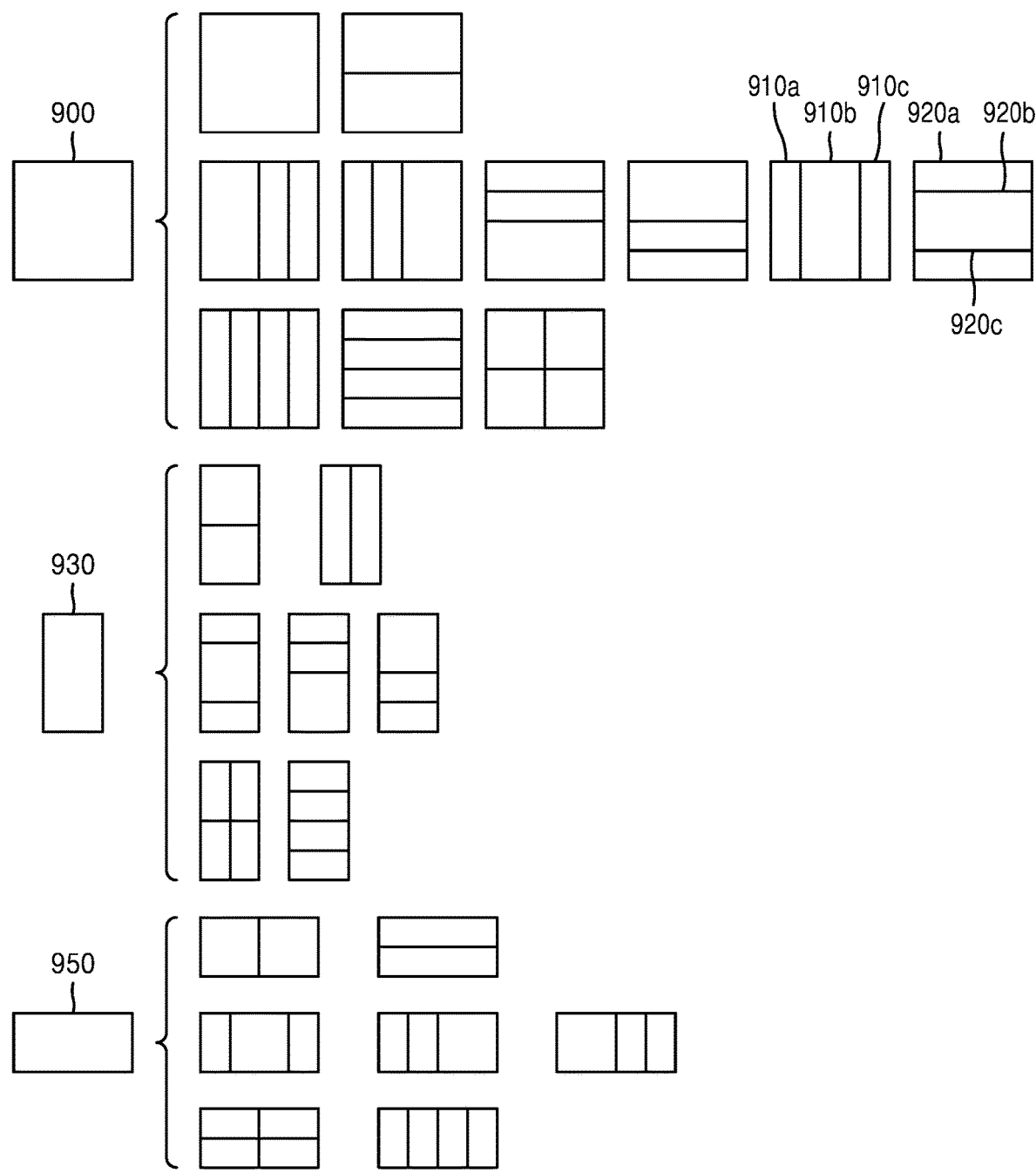
FIG. 9 illustrates a process, performed by an image decoding apparatus, of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on split shape mode information, which is obtained by the receiver 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a predetermined order, and the condition relates to whether at least one of a width and height of the first coding unit 900 is divided in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not divide the height of the first coding unit 900 in half, it may be determined that the first coding unit 900 does not satisfy the condition for processing in the predetermined order. In addition, because boundaries of the second coding units 920a, 920b, and 920c determined by splitting the square first coding unit 900 in a horizontal direction do not divide the width of the first coding unit 900 in half, it may be determined that the first coding unit 900 does not satisfy the condition for processing in the predetermined order. When the condition is not satisfied as described above, the image decoding apparatus 100 may decide disconnection of a scan order, and may determine that the first coding unit 900 is split into an odd number of coding units, based on a result of the decision. According to an embodiment, when a coding unit is split into an odd number of coding units, the image decoding apparatus 100 may put a predetermined restriction on a coding unit at a predetermined location from among the split coding units. The restriction or the predetermined location has been described above in relation to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
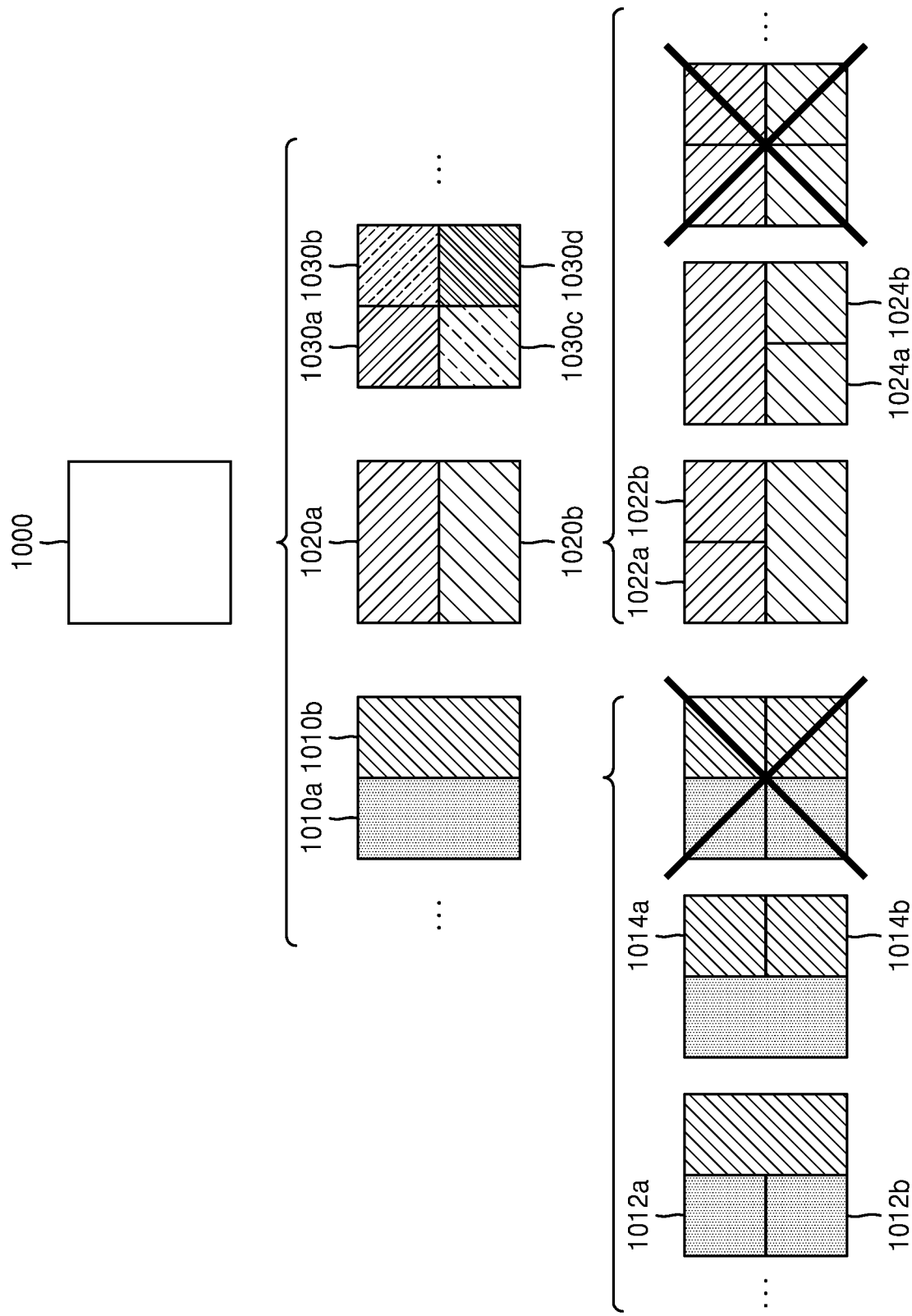
FIG. 10 illustrates that a shape into which a second coding unit is splittable is restricted when the second coding unit having a non-square shape, which is determined by an image decoding apparatus by splitting a first coding unit, satisfies a predetermined condition, according to an embodiment.

FIG. 10 illustrates that a shape into which a second coding unit is splittable by the image decoding apparatus 100 is restricted when the second coding unit having a non-square shape, which is determined by splitting a first coding unit 1000, satisfies a predetermined condition, according to an embodiment.

According to an embodiment, the image decoding apparatus 100 may determine to split the square first coding unit 1000 into non-square second coding units 1010a, 1010b, 1020a, and 1020b, based on split shape mode information, which is obtained by the receiver 110. The second coding units 1010a, 1010b, 1020a, and 1020b may be independently split. As such, the image decoding apparatus 100 may determine to split or not to split the first coding unit 1000 into a plurality of coding units, based on the split shape mode information of each of the second coding units 1010a, 1010b, 1020a, and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a, 1012b, 1014a, and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a, 1022b, 1024a, and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

Figure 11:
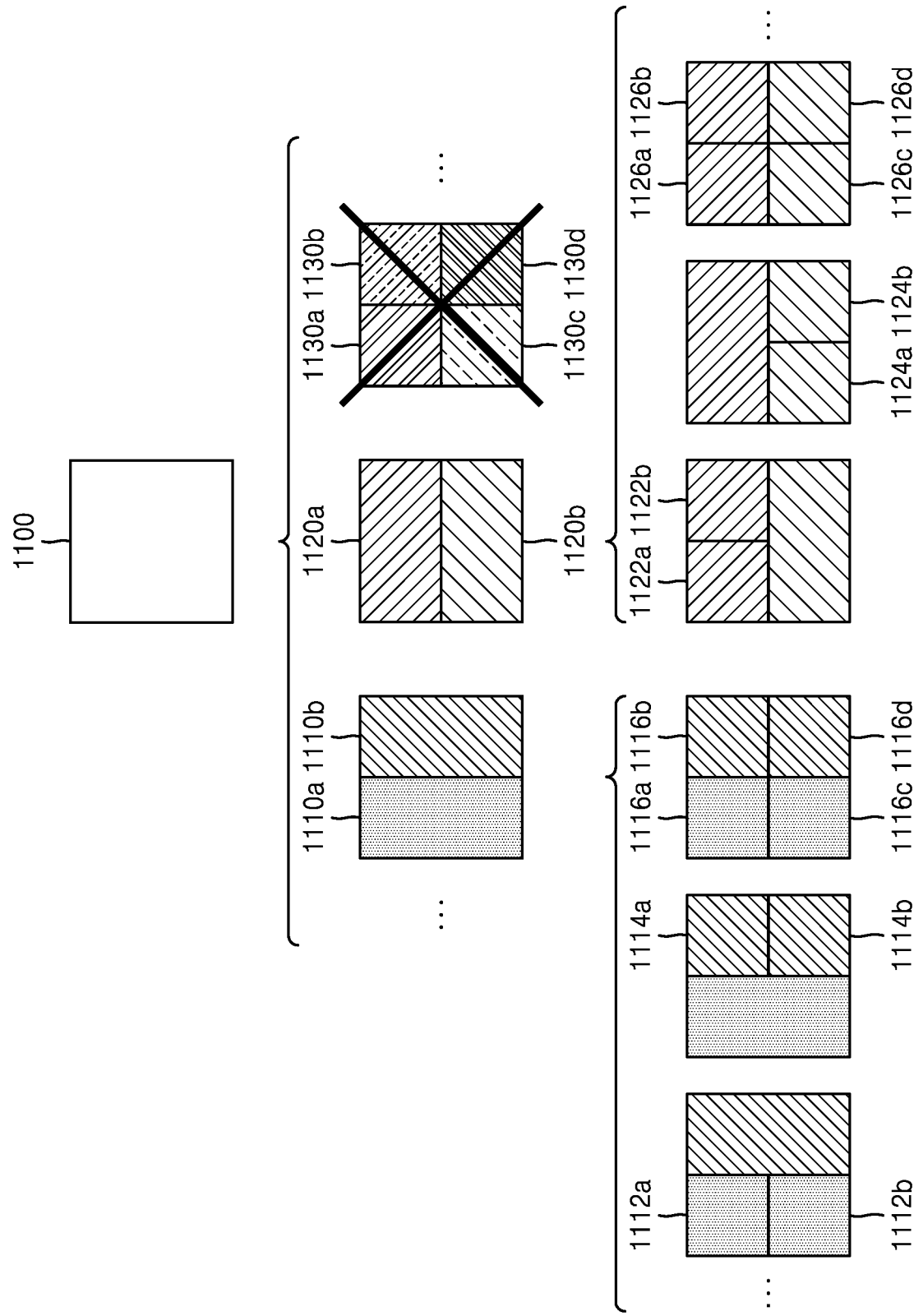
FIG. 11 illustrates a process, performed by an image decoding apparatus, of splitting a square coding unit when split shape mode information indicates that the square coding unit is not to be split into four square coding units, according to an embodiment.

FIG. 11 illustrates a process, performed by the image decoding apparatus 100, of splitting a square coding unit when split shape mode information indicates that the square coding unit is not to be split into four square coding units, according to an embodiment.

According to an embodiment, the image decoding apparatus 100 may determine second coding units 1110a, 1110b, 1120a, 1120b, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the first square coding unit 1100 into four square second coding units 1130a, 1130b, 1130c, and 1130d. The image decoding apparatus 100 may determine the non-square second coding units 1110a, 1110b, 1120a, 1120b, etc., based on the split shape mode information.

According to an embodiment, the image decoding apparatus 100 may independently split the non-square second coding units 1110a, 1110b, 1120a, 1120b, etc. Each of the second coding units 1110a, 1110b, 1120a, 1120b, etc. may be recursively split in a predetermined order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
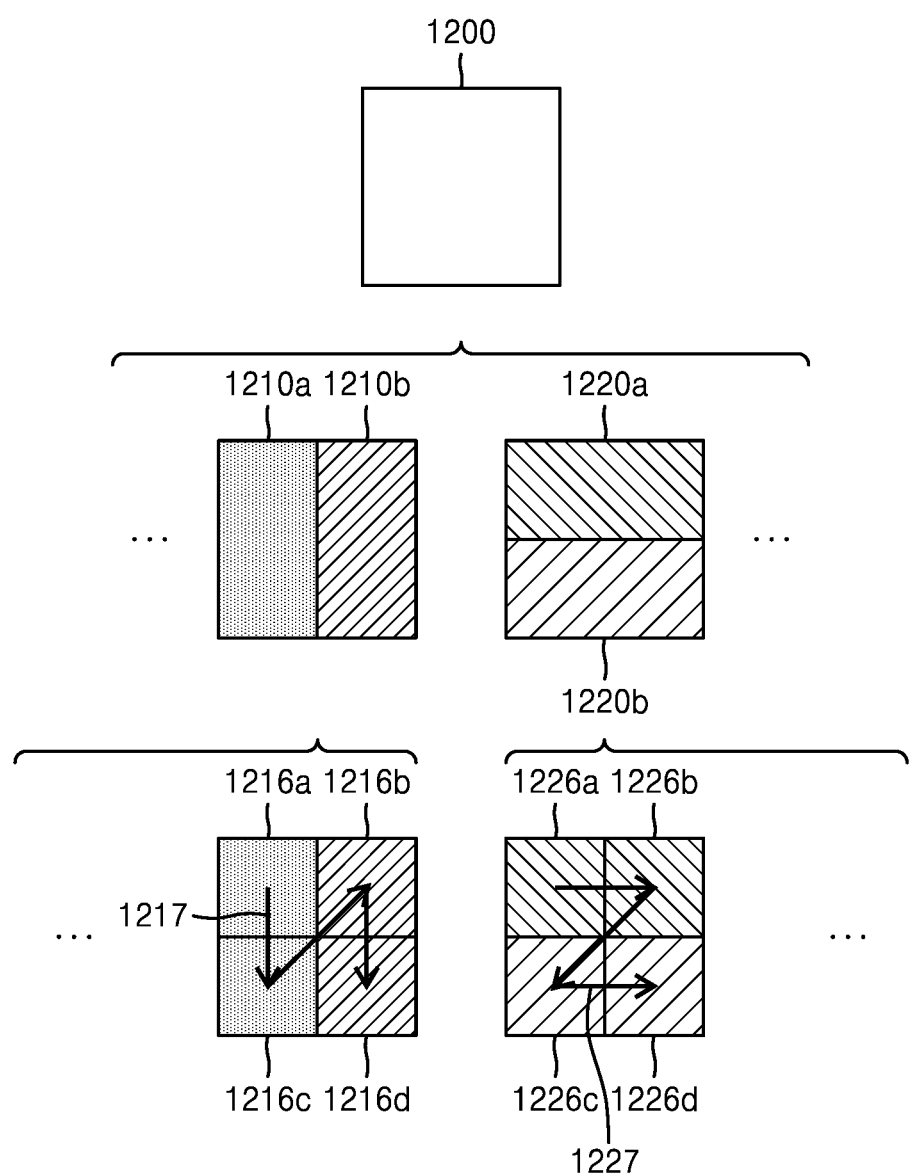
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape is a square and the split shape mode information indicates to split the first coding unit 1200 in at least one of horizontal and vertical directions, the image decoding apparatus 100 may determine second coding units 1210a, 1210b, 1220a, 1220b, etc. by splitting the first coding unit 1200. Referring to FIG. 12, the non-square second coding units 1210*a*, 1210*b*, 1220*a*, and 1220*b* determined by splitting the first coding unit 1200 in only a horizontal direction or vertical direction may be independently split based on the split shape mode information of each coding unit. For example, the image decoding apparatus 100 may determine third coding units 1216*a*, 1216*b*, 1216*c*, and 1216*d* by splitting the second coding units 1210*a* and 1210*b*, which are generated by splitting the first coding unit 1200 in a vertical direction, in a horizontal direction, and may determine third coding units 1226*a*, 1226*b*, 1226*c*, and 1226*d* by splitting the second coding units 1220*a* and 1220*b*, which are generated by splitting the first coding unit 1200 in a horizontal direction, in a vertical direction. An operation of splitting the second coding units 1210*a*, 1210*b*, 1220*a*, and 1220*b* has been described above in relation to FIG. 11, and thus detailed descriptions thereof will not be provided herein.

According to an embodiment, the image decoding apparatus 100 may process coding units in a predetermined order. An operation of processing coding units in a predetermined order has been described above in relation to FIG. 7, and thus detailed descriptions thereof will not be provided herein. Referring to FIG. 12, the image decoding apparatus 100 may determine four square third coding units 1216*a*, 1216*b*, 1216*c*, and 1216*d*, and 1226*a*, 1226*b*, 1226*c*, and 1226*d* by splitting the square first coding unit 1200. According to an embodiment, the image decoding apparatus 100 may determine processing orders of the third coding units 1216*a*, 1216*b*, 1216*c*, and 1216*d*, and 1226*a*, 1226*b*, 1226*c*, and 1226*d* based on a splitting method of the first coding unit 1200.

According to an embodiment, the image decoding apparatus 100 may determine the third coding units 1216*a*, 1216*b*, 1216*c*, and 1216*d* by splitting the second coding units 1210*a* and 1210*b* generated by splitting the first coding unit 1200 in a vertical direction, in a horizontal direction, and may process the third coding units 1216*a*, 1216*b*, 1216*c*, and 1216*d* in a processing order 1217 for initially processing the third coding units 1216*a* and 1216*c*, which are included in the left second coding unit 1210*a*, in a vertical direction and then processing the third coding unit 1216*b* and 1216*d*, which are included in the right second coding unit 1210*b*, in a vertical direction.

According to an embodiment, the image decoding apparatus 100 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 12, the square third coding units 1216*a*, 1216*b*, 1216*c*, and 1216*d*, and 1226*a*, 1226*b*, 1226*c*, and 1226*d* may be determined by splitting the second coding units 1210*a*, 1210*b*, 1220*a*, and 1220*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and size of the coding unit change, when the coding unit is recursively split such that a plurality of coding units are determined, according to an embodiment.

According to an embodiment, the image decoding apparatus 100 may determine the depth of the coding unit, based on a predetermined criterion. For example, the predetermined criterion may be the length of a long side of the coding unit. When the length of a long side of a coding unit before being split is $2n$ times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a deeper depth.

Referring to FIG. 13, according to an embodiment, the image decoding apparatus 100 may determine a second coding unit 1302 and a third coding unit 1304 of deeper depths by splitting a square first coding unit 1300 based on block shape information indicating a square shape (for example, the block shape information may be expressed as '0: SQUARE'). Assuming that the size of the square first coding unit 1300 is $2N \times 2N$, the second coding unit 1302 determined by dividing a width and height of the first coding unit 1300 to ½ may have a size of $N \times N$. Furthermore, the third coding unit 1304 determined by dividing a width and height of the second coding unit 1302 to ½ may have a size of $N/2 \times N/2$. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (for example, the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by dividing at least one of a width and height of the first coding unit 1310 having a size of $2N \times N$. That is, the image decoding apparatus 100 may determine the second coding unit 1302 having a size of $N \times N$ or the second coding unit 1322 having a size of $N \times N/2$ by splitting the first coding unit 1310 in a horizontal direction, or may determine the second coding unit 1312 having a size of $N/2 \times N$ by splitting the first coding unit 1310 in horizontal and vertical directions.

According to an embodiment, the image decoding apparatus 100 may determine the second coding unit 1302, 1312, or 1322 by dividing at least one of a width and height of the first coding unit 1320 having a size of $2N \times N$. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by dividing at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by dividing at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by dividing at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of 2N×N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
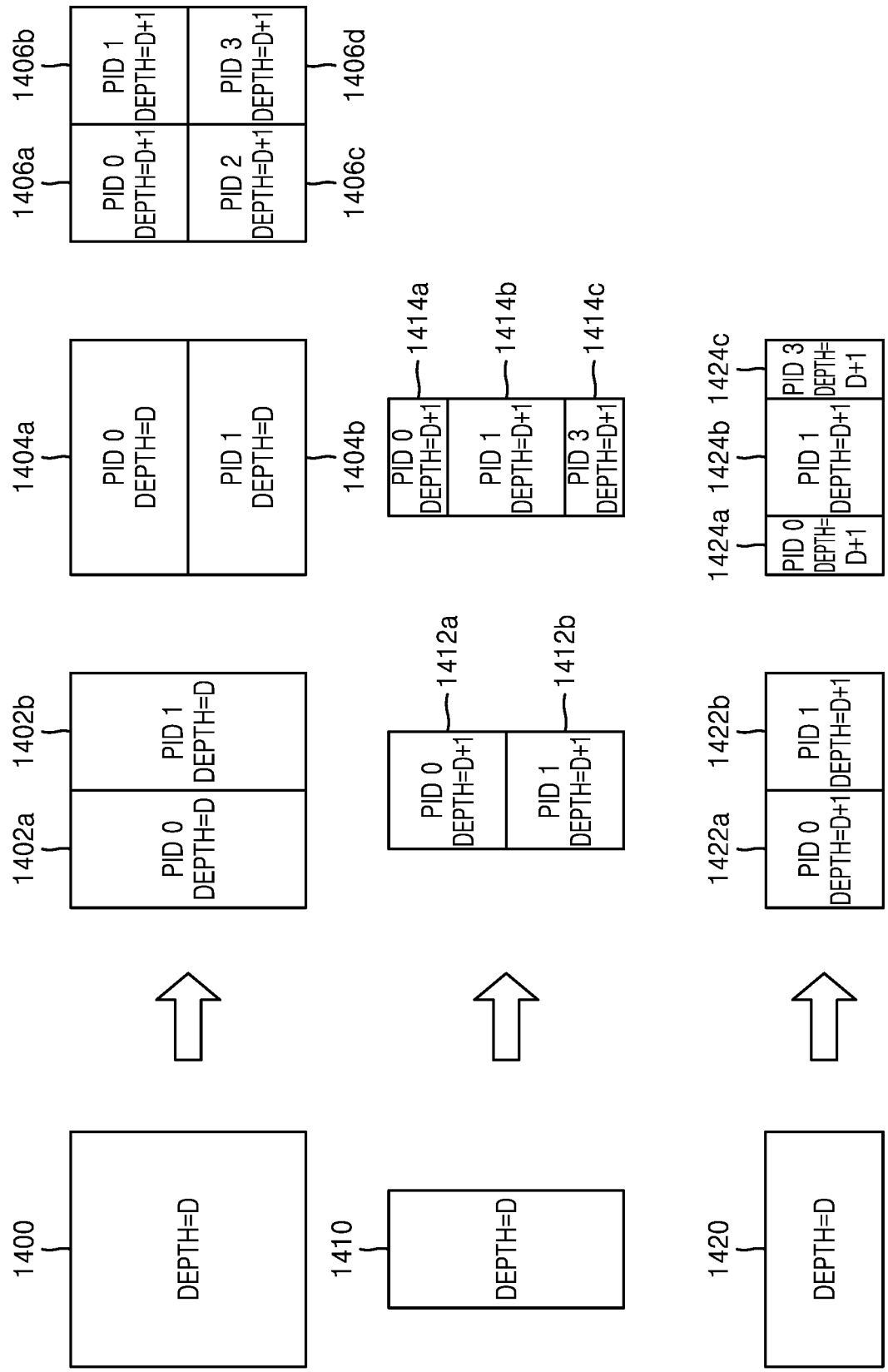
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, a depth of the second coding units 1402a and 1402b, 1404a and 1404b, and 1406a, 1406b, 1406c, and 1406d, which are determined based on the split shape mode information of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404a and 1404b may have the same depth, e.g., D. However, when the image decoding apparatus 100 splits the first coding unit 1400 into the four square second coding units 1406a, 1406b, 1406c, and 1406d based on the split shape mode information, because the length of a side of the square second coding units 1406a, 1406b, 1406c, and 1406d is ½ times the length of a side of the first coding unit 1400, a depth of the second coding units 1406a, 1406b, 1406c, and 1406d may be D+1 which is deeper than the depth D of the first coding unit 1400 by 1.

According to an embodiment, the image decoding apparatus 100 may determine a plurality of second coding units 1412a and 1412b, and 1414a, 1414b, and 1414c by splitting a first coding unit 1410, a height of which is longer than a width, in a horizontal direction based on the split shape mode information. According to an embodiment, the image decoding apparatus 100 may determine a plurality of second coding units 1422a and 1422b, and 1424a, 1424b, and 1424c by splitting a first coding unit 1420, a width of which is longer than a height, in a vertical direction based on the split shape mode information.

According to an embodiment, a depth of the second coding units 1412a and 1412b, 1414a, 1414b, and 1414c, 1422a and 1422b, and 1424a, 1424b, and 1424c, which are determined based on the split shape mode information of the non-square first coding unit 1410 or 1420, may be determined based on the length of a long side thereof. For example, because the length of a side of the square second coding units 1412a and 1412b is ½ times the length of a long side of the first coding unit 1410 having a non-square shape, a height of which is longer than a width, a depth of the square second coding units 1412a and 1412b is D+1 which is deeper than the depth D of the non-square first coding unit 1410 by 1.

Furthermore, the image decoding apparatus 100 may split the non-square first coding unit 1410 into an odd number of second coding units 1414a, 1414b, and 1414c based on the split shape mode information. The odd number of second coding units 1414a, 1414b, and 1414c may include the non-square second coding units 1414a and 1414c and the square second coding unit 1414b. In this case, because the length of a long side of the non-square second coding units 1414a and 1414c and the length of a side of the square second coding unit 1414b are ½ times the length of a long side of the first coding unit 1410, a depth of the second coding units 1414a, 1414b, and 1414c may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414*b* of a center location among an odd number of split coding units 1414*a*, 1414*b*, and 1414*c* may have a width equal to that of the other coding units 1414*a* and 1414*c* and a height which is two times that of the other coding units 1414*a* and 1414*c*. That is, in this case, the coding unit 1414*b* at the center location may include two of the other coding unit 1414*a* or 1414*c*. Therefore, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412*a* and 1412*b* or an odd number of coding units 1414*a*, 1414*b*, and 1414*c* by splitting the first coding unit 1410 having a rectangular shape, a height of which is longer than a width. The image decoding apparatus 100 may use PIDs to identify respective coding units. According to an embodiment, the PID may be obtained from a sample of a predetermined location of each coding unit (e.g., a top left sample).

According to an embodiment, the image decoding apparatus 100 may determine a coding unit at a predetermined location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PI Ds of an odd number of split coding units to determine a coding unit at a center location from among the coding units. The image decoding apparatus 100 may determine the coding unit 1414*b* having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a predetermined location among an odd number of coding units (e.g., a coding unit of a centre location) has a size different from that of the other coding units. In this case, the image decoding apparatus 100 may determine the coding unit of the centre location, which has a different size, by using PIDs of the coding units. However, the PIDs and the size or location of the coding unit of the predetermined location are not limited to the above-described examples, and various PI Ds and various locations and sizes of coding units may be used.

According to an embodiment, the image decoding apparatus 100 may use a predetermined data unit where a coding unit starts to be recursively split.

Figure 15:
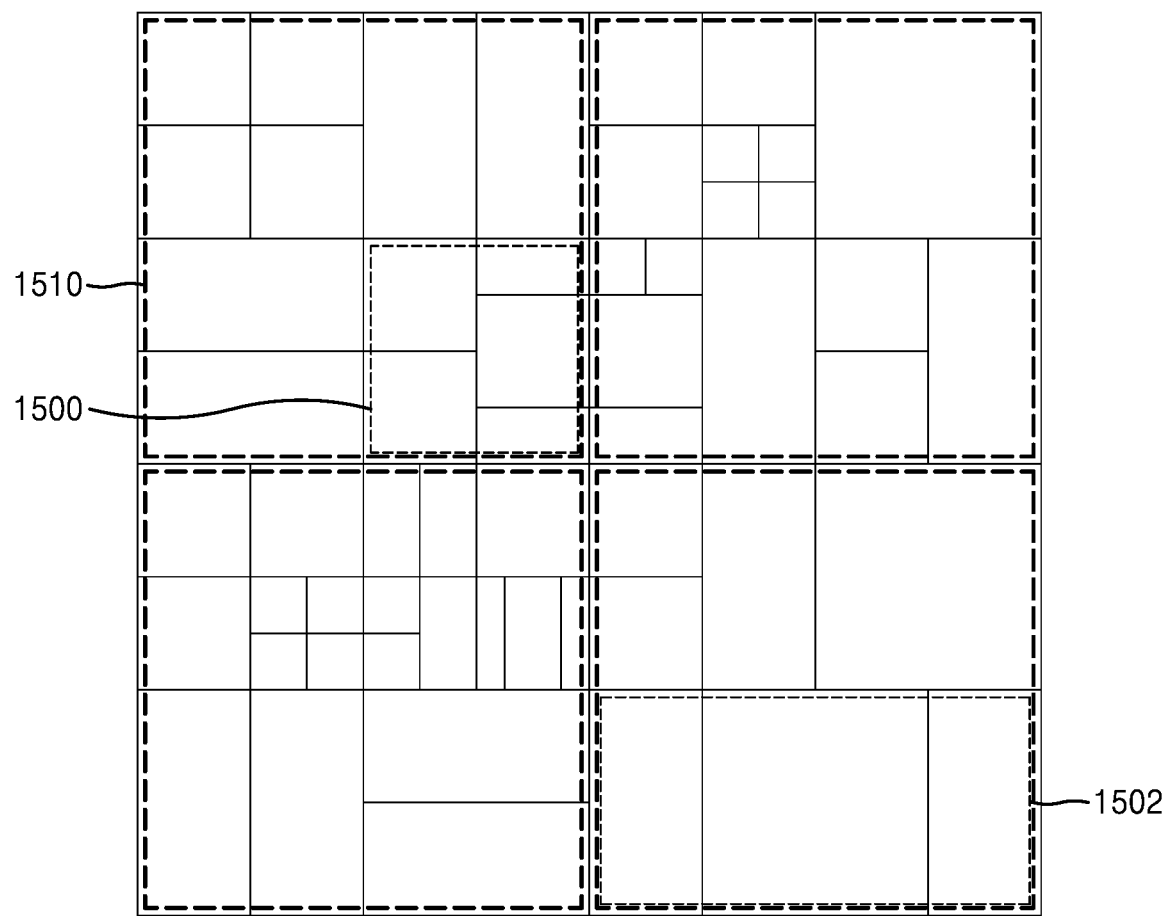
FIG. 15 illustrates that a plurality of coding units are determined based on a plurality of predetermined data units included in a picture, according to an embodiment.

FIG. 15 illustrates that a plurality of coding units are determined based on a plurality of predetermined data units included in a picture, according to an embodiment.

According to an embodiment, a predetermined data unit may be defined as a data unit where a coding unit starts to be recursively split by using at least one of block shape information and split shape mode information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined size shape. According to an embodiment, a reference coding unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using splitting information about each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, CTUs, or the like).

According to an embodiment, the receiver 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units previously determined based on a predetermined condition. That is, the receiver 110 may obtain, from the bitstream, only the PID for identifying the size and shape of reference coding units with respect to each slice, slice segment, or CTU which is a data unit satisfying a predetermined condition (e.g., a data unit having a size equal to or smaller than a slice) among the various data units (e.g., sequences, pictures, slices, slice segments, CTUs, or the like). The image decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a CTU. That is, a CTU split from a picture may include one or more reference coding units, and coding units may be determined by recursively splitting each reference coding unit. According to an embodiment, at least one of a width and height of the CTU may be integer times at least one of the width and height of the reference coding units. According to an embodiment, the size of reference coding units may be obtained by splitting the CTU n times based on a quadtree structure. That is, the image decoding apparatus 100 may determine the reference coding units by splitting the CTU n times based on a quadtree structure, and may split the reference coding unit based on at least one of the block shape information and the split shape mode information according to various embodiments.

Figure 16:
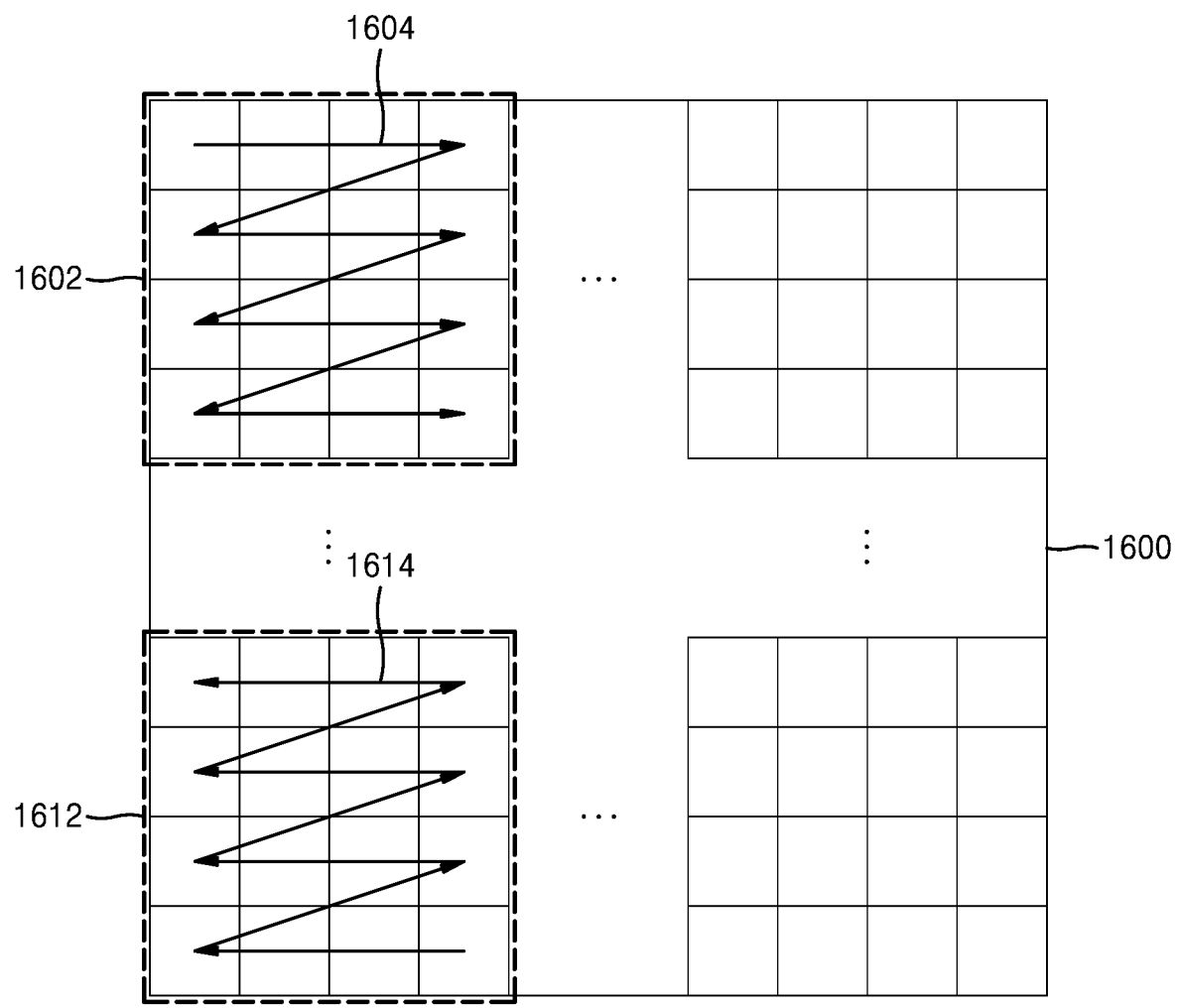
FIG. 16 illustrates a processing block serving as a unit for determining a determination order of reference coding units included in a picture, according to an embodiment.

FIG. 16 illustrates a processing block serving as a unit for determining a determination order of reference coding units included in a picture 1600, according to an embodiment.

According to an embodiment, the image decoding apparatus 100 may determine one or more processing blocks split from a picture. The processing block is a data unit including one or more reference coding units split from a picture, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan order, Z-scan, N-scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the picture. The image decoding apparatus 100 may obtain the processing block size information from a bitstream and may determine the size of one or more processing blocks included in the picture. The size of processing blocks may be a predetermined size of data units, which is indicated by the processing block size information.

According to an embodiment, the receiver 110 of the image decoding apparatus 100 may obtain the processing block size information from the bitstream according to each specific data unit. For example, the processing block size information may be obtained from the bitstream in a data unit such as an image, sequence, picture, slice, or slice segment. That is, the receiver 110 may obtain the processing block size information from the bitstream according to each of the various data units, and the image decoding apparatus 100 may determine the size of one or more processing blocks, which are split from the picture, by using the obtained processing block size information. The size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each specific data unit. For example, the receiver 110 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on the determined determination order.

According to an embodiment, the receiver 110 may obtain the determination order information of reference coding units from the bitstream as information related to the processing blocks 1602 and 1612, and the image decoding apparatus 100 may determine a determination order of one or more reference coding units included in the processing blocks 1602 and 1612 and determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different types of the determination order information of reference coding units may be obtained for the processing blocks 1602 and 1612. When the determination order 1604 of reference coding units in the processing block 1602 is a raster scan order, reference coding units included in the processing block 1602 may be determined according to a raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, or a slice segment header. Furthermore, the image decoding apparatus 100 may obtain, from the bitstream, syntax corresponding to the block shape information or the split shape mode information according to each CTU, each reference coding unit, or each processing block, and may use the obtained syntax.

Hereinafter, a method of determining a splitting rule according to an embodiment of the present disclosure is described in detail.

The image decoding apparatus 100 may determine the splitting rule of an image. The splitting rule may be predetermined between the image decoding apparatus 100 and the image encoding apparatus 2800. The image decoding apparatus 100 may determine the splitting rule of the image based on information obtained from a bitstream. The image decoding apparatus 100 may determine the splitting rule based on information obtained from at least one of a sequence parameter set, a picture parameter set, a video parameter set, a slice header, and a slice segment header. The image decoding apparatus 100 may differently determine the splitting rule according to a frame, a slice, a temporal layer, a CTU, or a coding unit.

The image decoding apparatus 100 may determine the splitting rule based on a block shape of the coding unit. The block shape may include a size, a shape, a ratio of width to height, and a direction of the coding unit. The image encoding apparatus 2800 and the image decoding apparatus 100 may determine to determine the splitting rule based on the block shape of the coding unit. However, it is not limited thereto. The image decoding apparatus 100 may determine the splitting rule based on information obtained from a bitstream received from the image encoding apparatus 2800.

The shape of the coding unit may include a square and a non-square. When the width and the height of the coding unit are the same as each other, the image decoding apparatus 100 may determine the shape of the coding unit as a square. Also, when the width and the height of the coding unit are not the same as each other, the image decoding apparatus 100 may determine the shape of the coding unit as a non-square.

The size of the coding unit may include various sizes including 4×4, 8×4, 4×8, 16×4, 16×8, . . . , and 256×256. The size of the coding unit may be divided according to a length of a long side, a length of a short side, or a breadth of the coding unit. The image decoding apparatus 100 may apply the same splitting rule to coding units that are divided into the same group. For example, the image decoding apparatus 100 may divide coding units having long sides having the same lengths as the same size. Also, the image decoding apparatus 100 may apply the same splitting rule to the coding units having the long sides having the same lengths.

The ratio of width to height of the coding unit may include 1:2, 2:1, 1:4, 4:1, 1:8, 8:1, 1:16, 16:1, 32:1, or 1:32. Also, the direction of the coding unit may include a horizontal direction and a vertical direction. The horizontal direction may indicate a case in which the width of the coding unit is greater than the height of the coding unit. The vertical direction may indicate a case in which the width of the coding unit is less than the height of the coding unit.

The image decoding apparatus 100 may adaptively determine the splitting rule based on the size of the coding unit. The image decoding apparatus 100 may differently determine a permissible split shape mode based on the size of the coding unit. For example, the image decoding apparatus 100 may determine whether or not to allow splitting based on the size of the coding unit. The image decoding apparatus 100 may determine a split direction according to the size of the coding unit. The image decoding apparatus 100 may determine a permissible split type according to the size of the coding unit.

The determining the splitting rule based on the size of the coding unit may be a splitting rule predetermined between the image encoding apparatus 2800 and the image decoding apparatus 100. Also, the image decoding apparatus 100 may determine the splitting rule based on the information obtained from the bit stream.

The image decoding apparatus 100 may adaptively determine the splitting rule based on a location of the coding unit. The image decoding apparatus 100 may adaptively determine the splitting rule based on a location of an image, which is occupied by the coding unit.

Also, the image decoding apparatus 100 may determine the splitting rule such that coding units generated by using different splitting methods do not have the same block shape. However, it is not limited thereto and coding units generated by using different splitting methods may have the same block shape. The coding units generated by using the different splitting methods may have different decoding processing orders. The decoding process orders are described with reference to FIG. 12, and thus, a detailed description thereof is omitted.

A method of determining an encoding order of a current block and a method of applying an AMVR mode according to the encoding order are described with reference to FIGS. 17 through 28.

Figure 17:
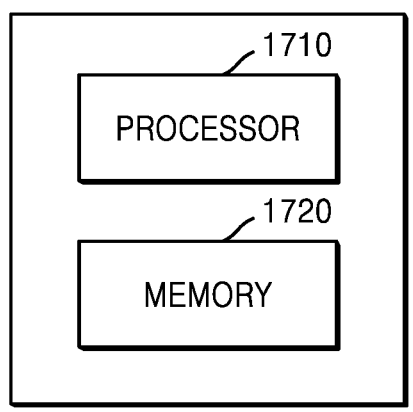
FIG. 17 illustrates a video decoding apparatus for splitting a current block and determining an encoding order of deeper split blocks, according to an embodiment.

FIG. 17 illustrates a video decoding apparatus 1700 for splitting a current block and encoding lower blocks that are split, according to an embodiment.

The video decoding apparatus 1700 may include a processor 1710 and a memory 1720. In FIG. 17, the processor 1710 and the memory 1720 are illustrated as components located in one apparatus. However, the processor 1710 and the memory 1720 do not necessarily have to be physically adjacent to each other. Thus, according to an embodiment, the processor 1710 and the memory 1720 may be separated from each other. FIG. 17 illustrates that the processor 1710 is a single component. However, according to embodiments, a plurality of processors may be included in the video encoding apparatus 1700.

Functions performed by the processor 1710 in FIG. 17 may be performed by the decoder 120 of FIG. 1.

The processor 1710 may obtain split information indicating whether or not to split a current block. The split information indicates whether or not to split the current block into two or more smaller blocks. Also, when the split information indicates to split the current block, the processor 1710 splits the current block into two or more lower blocks.

The current block may be split into various shapes according to a shape of the current block. For example, when the current block has a square shape, the current block may be split into four deeper square blocks according to the split information.

When two or more splitting methods are allowed to the shape of the current block, the processor 1710 may select a splitting method according to split shape information. Thus, when the split information indicates to split the current block, the processor 1710 may obtain the split shape information indicating the splitting method of the current block. Also, the processor 1710 may split the current block according to the splitting method indicated by the split shape information.

For example, when the current block has a square shape and has a size of 2N×2N, the split shape information may indicate a splitting method applied to the current block, from among N×N split, N×2N split, 2N×N split, vertical non-uniform ternary-split, and horizontal non-uniform ternary-split The N×N split is a method of splitting the current block into four N×N-sized blocks. The N×2N split is a method of splitting the current block into an N×2N-sized block. The 2N×N split is a method of splitting the current block into a 2N×N-sized block. The vertical non-uniform ternary-split denotes a method of splitting a 2N×2N-sized block into three blocks having the same width and a ratio of heights of 1:2:1. The horizontal non-uniform ternary-split denotes a method of splitting the 2N×2N-sized block into three blocks having the same height and a ratio of widths of 1:2:1. In addition, the current block may be split by one of various horizontal splitting methods or vertical splitting methods.

When the current block has a size of N×2N and is a rectangle having a great length in a vertical direction, the split shape information may indicate a splitting method applied to the current block from the N×N split and the vertical non-uniform ternary-split. The N×N split is a method of splitting the current block into two N×N-sized blocks. The vertical non-uniform ternary-split denotes a method of splitting an N×2N-sized block into three blocks having the same width and a ratio of heights of 1:2:1. In addition, the current block may be split by one of various horizontal or vertical splitting methods.

When the current block has a size of 2N×N and is a rectangle having a great length in a horizontal direction, the split shape mode information may indicate a splitting method applied to the current block from the N×N split and the horizontal non-uniform ternary-split. The N×N split is a method of splitting the current block into two N×N-sized blocks. The horizontal non-uniform ternary-split denotes a method of splitting a 2N×N-sized block into three blocks having the same height and a ratio of widths of 1:2:1. In addition, the current block may be split by one of various horizontal or vertical splitting methods.

In addition to the above splitting methods, a method of splitting the current block by using an asymmetric ratio, a method of splitting the current block into a triangular shape, a method of splitting the current block into other geometric shapes, etc. may be used as methods of splitting the current block having sizes of a square and a rectangle.

When the split information does not indicate to split the current block, the processor 1710 does not split the current block. Also, the processor 1710 decodes the current block.

When the current block is a coding unit, the processor 1710 determines the current block as a final coding unit. The final coding unit is not further split into deeper coding units. According to an embodiment, the processor 1710 may split the current block, which is the final coding unit, into data units other than coding units.

According to an embodiment, the processor 1710 may split the current block into one or more prediction units according to a hierarchical tree structure. Likewise, the processor 1710 may split the current block into one or more transform units according to a hierarchical tree structure. Also, the processor 1710 may reconstruct the current block according to a prediction result with respect to the prediction unit and a transform result with respect to the transform unit.

When the current block is a prediction unit, the processor 1710 may perform prediction on the current block. Also, when the current block is a transform unit, the processor 1710 may obtain residual data by performing inverse quantization and inverse transform on a transform coefficient quantized with respect to the current block.

The processor 1710 obtains encoding order information indicating an encoding order of lower blocks. Also, the processor 1710 may determine a decoding order of the lower blocks according to the obtained encoding order information.

The encoding order information indicates an encoding order of two or more lower blocks included in a current block. The amount of data of the encoding order information is determined according to the number of lower blocks and a method of determining the encoding order.

For example, when there are two lower blocks, the encoding order information may be determined to indicate a lower block to be encoded earlier from the two lower blocks. Thus, the encoding order information may have the form of a flag having the amount of data of 1 bit.

However, when there are four lower blocks, the number of cases of the encoding order of the lower blocks is 4!=24. Thus, in order to indicate 24 encoding orders, the amount of data of 5 bit is required. That is, as the number of lower blocks is increased, the number of cases of the encoding order is increased. Thus, in order to reduce the amount of data of the encoding order information, an encoding order determination method that determines an encoding order by determining whether or not an encoding order of some pairs of lower blocks is swapped with respect to a predetermined basic encoding order, may be used. Encoding order information indicating whether or not the encoding order of some pairs of lower blocks is swapped indicates whether the encoding order is a forward direction or a reverse direction with respect to the basic encoding order.

Figure 18A:
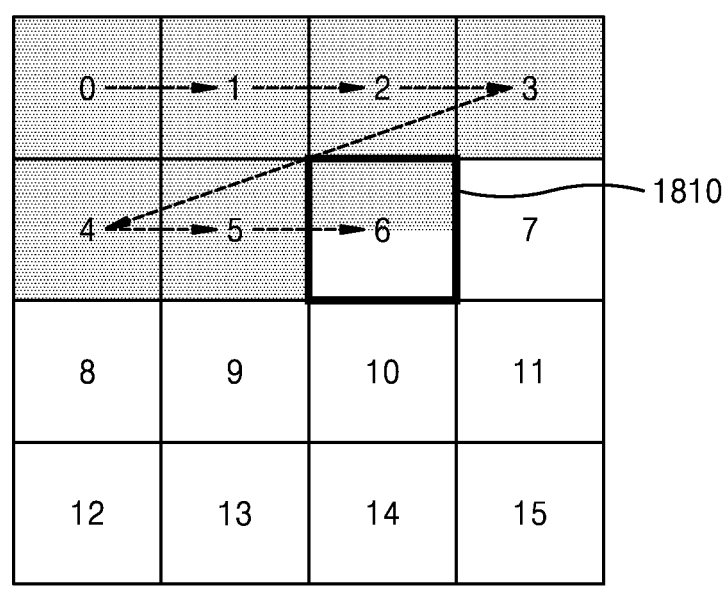
FIGS. 18A through 18C illustrate a basic encoding order according to an embodiment.
Figure 18B:
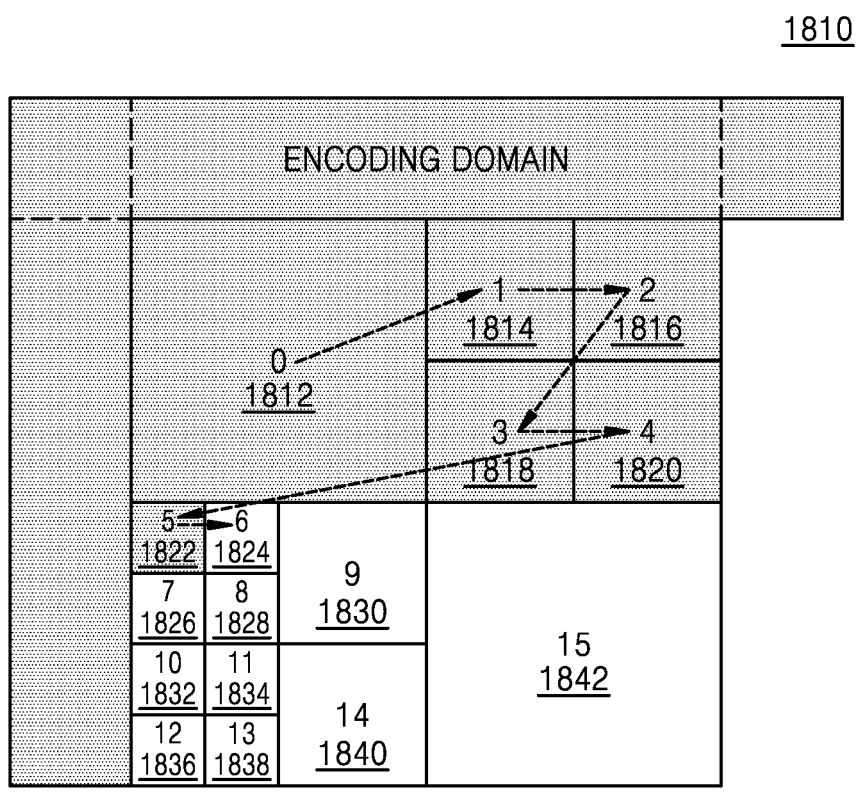
Figure 18C:
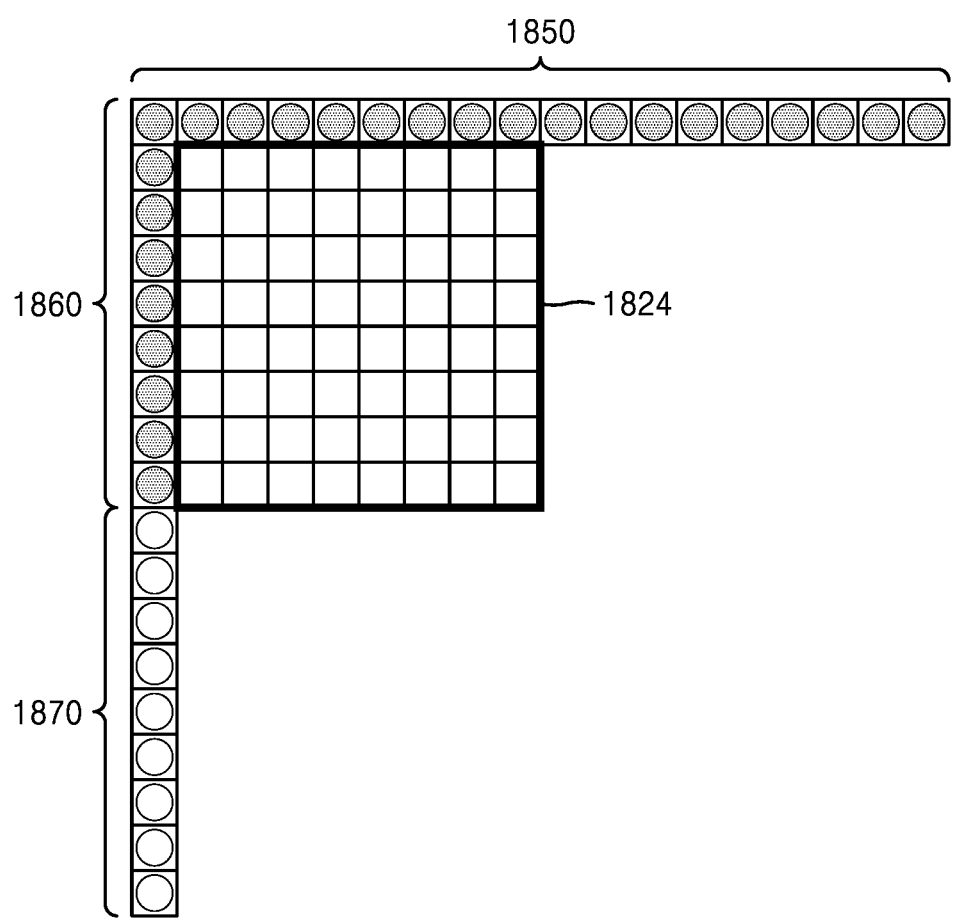

A current picture including the current block is encoded and decoded according to the basic encoding order. All blocks and pixels encoded and decoded in the current picture are encoded and decoded according to the basic encoding order at the same level. Thus, lower blocks of the same level that are split from the current block are also encoded and decoded according to the basic encoding order. An embodiment of the basic encoding order is illustrated in FIGS. 18A through 18C to be described below.

Thus, when a pair of lower blocks are encoded according to the basic encoding order, it is mentioned that the pair of lower blocks are encoded in a forward direction. On the contrary, when a pair of lower blocks are encoded in an order which is the opposite to the basic encoding order, it is mentioned that the pair of lower blocks are encoded in a reverse direction.

For example, when two lower blocks are adjacent to each other in a horizontal direction and are encoded in a forward direction, the encoding order information may be determined such that a left lower block is decoded earlier. On the contrary, when the two lower blocks adjacent to each other in the horizontal direction are encoded in a reverse direction, the encoding order information may be determined such that a right lower block is decoded earlier.

Likewise, when two lower blocks are adjacent to each other in a vertical direction and are encoded in a forward direction, the encoding order information may be determined such that an upper lower block is decoded earlier. On the contrary, when the two lower blocks adjacent to each other in the vertical direction are encoded in a reverse direction, the encoding order information may be determined such that a lower lower block is decoded earlier.

When the encoding order information indicates only an encoding order of a pair of lower blocks, the encoding order information has the amount of data of 1 bit. The encoding order information having the amount of data of 1 bit may be defined as an encoding order flag.

The processor 1710 may obtain the encoding order information from a bitstream. The encoding order information may be located in the bitstream after the split information.

The processor 1710 may intrinsically determine the encoding order information according to a peripheral environment of the current block. The encoding order information may be determined according to whether or not peripheral blocks adjacent to the current block are encoded. For example, the processor 1710 may determine a lower block which has more adjacent peripheral blocks than the other lower blocks to be decoded earlier.

With respect to the processor 1710, FIGS. 18A through 18C describe the basic encoding order according to an embodiment. The basic encoding order of FIGS. 18A through 18C is a Z encoding order. According to the Z encoding order, data units are encoded from a left direction to a right direction, and when all data units in a current row are encoded, data units included in a row below the current row are encoded from the left direction to the right direction. The Z encoding order described above is referred to as a raster scan order.

FIG. 18A illustrates encoding orders of CTUs included in a current picture 1800 according to the Z encoding order. Indices of 0 to 15 are set with respect to the CTUs according to the Z encoding order. The CTUs in a first row, for which the indices of 0 to 3 are set according to the Z encoding order, are encoded earlier, and the CTUs in a second row, for which the indices of 4 to 7 are set, are encoded from the left direction to the right direction. The CTUs are also intrinsically encoded according to the Z encoding order.

Figure 19A:
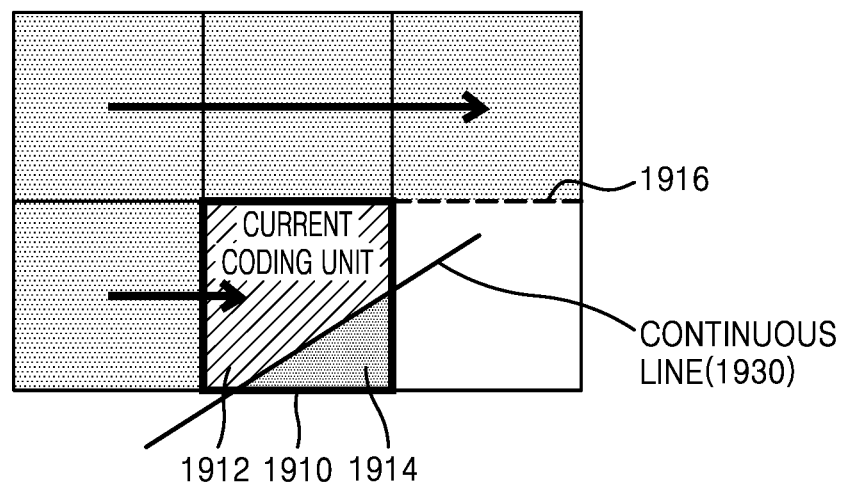
FIGS. 19A and 19B illustrate a case in which a coding unit is encoded in a forward direction and a case in which a coding unit is encoded in a reverse direction, respectively.
Figure 19B:
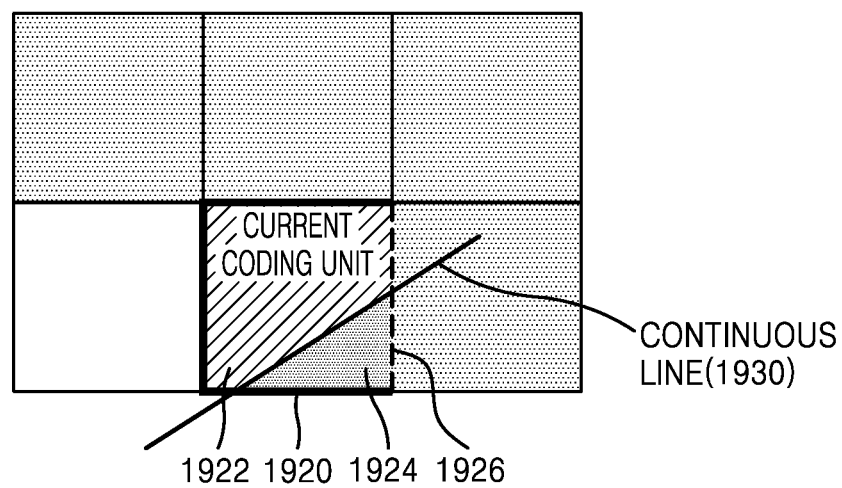

FIG. 19B illustrates an encoding order of a CTU 1810 of a sixth index from among the CTUs included in the current picture 1800. With respect to coding units having a final depth, on which splitting is completed, indices of 0 to 15 are set, according to the Z encoding order. The Z encoding order is applied to data units having the same depth. Also, until all of deeper coding units of a coding unit having an n-depth are encoded, a next-order coding unit having an n-depth is not encoded. For example, until all coding units having indices of 5 to 14 are encoded, a coding unit having an index of 15 is not encoded. The coding units are also intrinsically encoded according to the Z encoding order.

FIG. 18C illustrates a reference sample referred to by a coding unit 1824 having a sixth index from among coding units included in the CTU 1810. Only coding units 1812 and 1822 having a zeroth index and a fifth index, respectively, are reconstructed around the coding unit 1824 having the sixth index, which is currently encoded. Thus, only a pixel 1850 of the coding unit 1812 and a pixel 1860 of the coding unit 1822 may be used as the reference sample with respect to the coding unit 1824.

The Z encoding order of FIGS. 19A through 19C may be applied in a different direction according to a data unit. For example, the Z encoding order may be changed to encode the data unit in the same row from a right direction to a left direction. Also, the Z encoding order may be changed such that data units included in an upper row with respect to a current row are encoded after all data units in the current row are encoded. Also, the Z encoding order may be changed such that data units in the same column are encoded from an upper direction to a lower direction and data units included in a right column with respect to a current column are encoded after all data units in the current column are encoded.

With respect to the processor 1710, FIGS. 19A and 19B illustrate a case 1900 in which a coding unit 1910 is encoded in a forward direction and a case 1902 in which a coding unit 1920 is encoded in a reverse direction, respectively. Advantages obtained by changing the encoding order according to FIGS. 19A and 19B are described.

The coding units 1910 and 1920 of FIGS. 19A and 19B are predicted according to an intra mode in a top right direction. A continuous line 1930 of FIGS. 19A and 19B is pixels arranged in the form of a straight line in an original image and having constant values. Thus, when a current coding unit is predicted in a direction of the continuous line 1930, the prediction accuracy of the coding units 1910 and 1920 may be improved.

A left coding unit, a top coding unit, and a top right coding unit with respect to the current coding unit 1910 are reconstructed earlier than the current coding unit 1910 in the case 1900 in which the coding unit 1910 is encoded in the forward direction. Thus, the current coding unit 1910 refers to pixels or encoding information of the left coding unit, the top coding unit, and the top right coding unit. For example, pixels 1916 located at a bottom edge of the top right coding unit are used to predict the current coding unit 1910. The pixels 1916 are spatially apart from the current coding unit 1910, and thus, prediction accuracy with respect to a portion 1914 of the current coding unit 1910 may be low.

However, in the case 1902 in which the current coding unit 1910 is encoded in the reverse direction, a right coding unit, the top coding unit, and a top left coding unit with respect to the current coding unit 1910 are reconstructed earlier than the current coding unit 1920, and thus, pixels 1926 located at a left edge of the upper coding unit may be used to predict the current coding unit 1920 in intra prediction. The pixels 1926 are adjacent to the current coding unit 1829, and thus, prediction accuracy with respect to a portion 1924 of the current coding unit 1920 may be higher than the prediction accuracy with respect to the portion 1914 of the current coding unit 1910.

As described in the embodiment with respect to the intra prediction of FIGS. 19A and 19B, with respect to inter prediction, there are many cases in which prediction accuracy may be increased by obtaining encoding information from a block located in a reverse direction. When a current coding unit and a right coding unit of the current coding unit are coding units with respect to the same object, the current coding unit may have similar motion information as the right coding unit. Thus, the motion information of the current coding unit may be derived from the motion information of the right coding unit, to increase the coding efficiency.

Thus, the encoding efficiency of an image may be improved by determining an encoding order by comparing the coding efficiency of the case in which the current coding unit is encoded in a forward direction with the coding efficiency of the case in which the current coding unit is encoded in a reverse direction.

The encoding order information may be set to be the same as encoding order information applied to an upper block of the current block. For example, when the current block is a prediction unit or a transform unit, the processor 1710 may apply encoding order information applied to a coding unit including the current block, to the current block. As another example, when the current block is a coding unit, the processor 1710 may apply encoding order information applied to a coding unit having a less depth than the current block, to the current block.

When there are two or more encoding order flags with respect to the current block, the processor 1710 may obtain only one encoding order flag from a bitstream and may determine the rest encoding order flags to be synchronized to the encoding order flag obtained from the bitstream.

Figure 20:
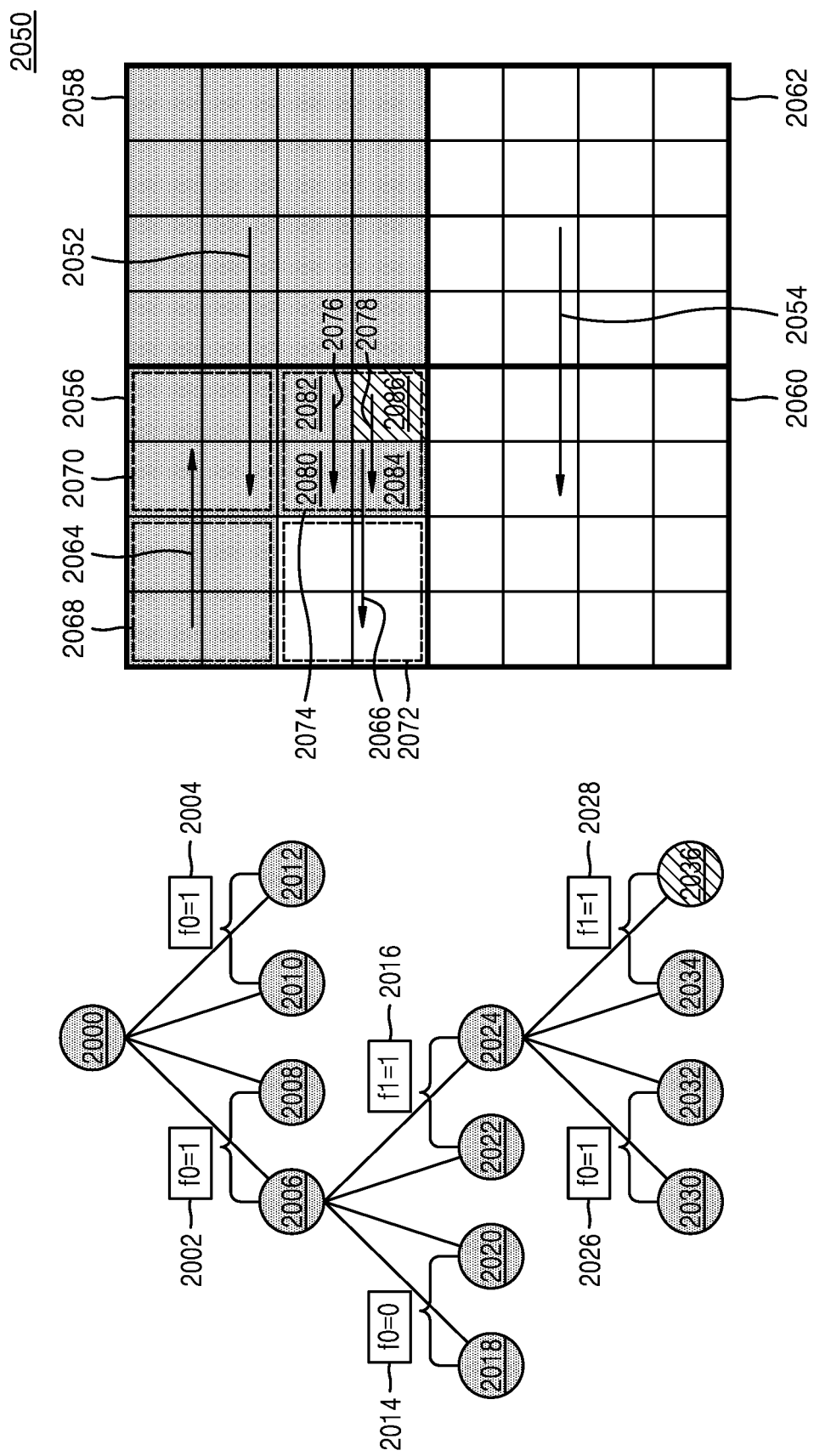
FIG. 20 illustrates a coding tree unit and a tree structure of the coding tree unit for describing an encoding order of coding units included in the coding tree unit.

In relation to the determining of the encoding order via the processor 1710, FIG. 20 illustrates a CTU and a tree structure of the CTU for describing an encoding order of coding units included in the CTU.

A CTU 2050 is split into a plurality of coding units 2056, 2058, 2060, 2062, 2068, 2070, 2072, 2074, 2080, 2082, 2084, and 2086. The CTU 2050 corresponds to an uppermost node 2000 of the tree structure. Also, the plurality of coding units 2056, 2058, 2060, 2062, 2068, 2070, 2072, 2074, 2080, 2082, 2084, and 2086 correspond to a plurality of nodes 2006, 2008, 2010, 2012, 2018, 2020, 2022, 2024, 2030, 2032, 2034, and 2036, respectively. Upper encoding order flags 2002, 2014, and 2026 indicating the encoding order in the tree structure correspond to arrows 2052, 2064, and 2076, and lower encoding order flags 2004, 2016, and 2028 correspond to arrows 2054, 2066, and 2078.

The upper encoding order flags indicate encoding orders of two coding units located at an upper portion, from among four coding units having the same depth. When the upper encoding order flag is 0, encoding is performed in a forward direction. On the contrary, when the upper encoding order flag is 1, encoding is performed in a reverse direction.

Likewise, lower encoding order flags indicate encoding orders of two coding units located at a lower portion, from among four coding units having the same depth. When the lower encoding order flag is 0, encoding is performed in a forward direction. On the contrary, when the lower encoding order flag is 1, encoding is performed in a reverse direction.

For example, since the upper encoding order flag 2014 is 0, an encoding order between the coding units 2068 and 2070 is determined to be a forward direction, that is, from a left location to a right location. Also, since the lower encoding order flag 2016 is 1, an encoding order between the coding units 2072 and 2074 is determined to be a reverse direction, that is, from a right location to a left location.

According to an embodiment, the upper encoding order flag and the lower encoding order flag may be set to have the same value. For example, when the upper encoding order flag 2002 is determined to be 1, the lower encoding order flag 2004 corresponding to the upper encoding order flag 2002 may also be determined to be 1. The upper encoding order flag and the lower encoding order flag are determined to have the value of 1 bit, and thus, the amount of data of the encoding order information is decreased.

According to an embodiment, the upper encoding order flag and the lower encoding order flag of the current coding unit may be determined by referring to at least one of an upper encoding order flag and a lower encoding order flag that are applied to a coding unit having a less depth than the current coding unit. For example, the upper encoding order flag 2026 and the lower encoding order flag 2028 applied to the coding units 2080, 2082, 2084, and 2086 may be determined based on the lower encoding order flag 2016 applied to the coding units 2072 and 2074. Thus, the upper encoding order flag 2026 and the lower encoding order flag 2028 may be determined to have the same value as the lower encoding order flag 2016. Since values of the upper encoding order flag and the lower encoding order flag are determined based on an upper coding unit of the current coding unit, the encoding order information is not obtained from the bitstream. Thus, the amount of data of the encoding order information is reduced.

Figure 21A:
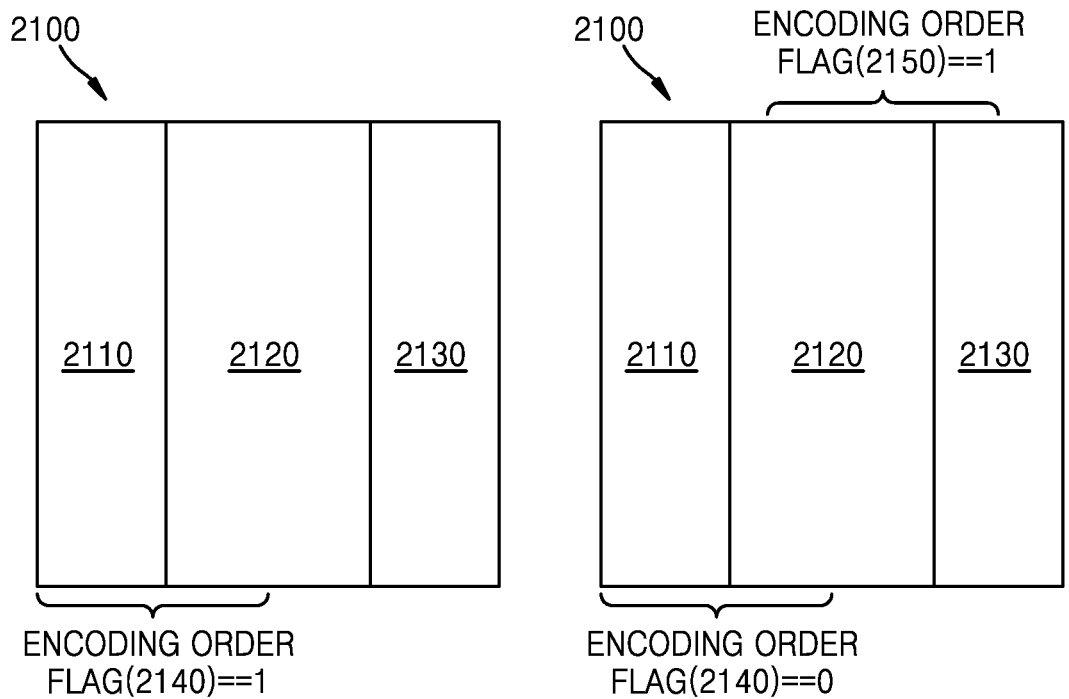
FIGS. 21A and 21B describe how an encoding order of three or more blocks arranged in a vertical or horizontal direction is changed according to an encoding order flag.
Figure 21B:
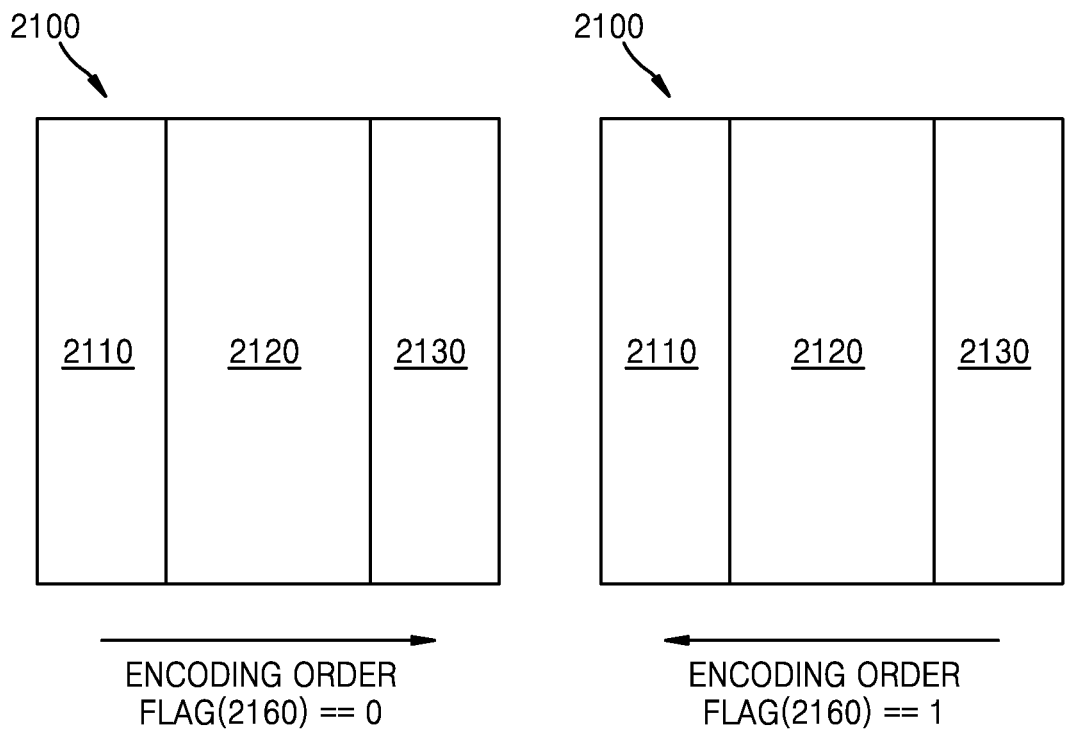

In relation to the determining the encoding order via the processor 1710, FIGS. 21A and 21B describe how an encoding order of three or more blocks arranged in a vertical or a horizontal direction is changed according to an encoding order flag.

An embodiment of FIG. 21A relates to a method of swapping an encoding order based on a encoding order flag, only when an encoding order of coding units spatially adjacent to each other is adjacent.

A coding unit 2100 is split into three coding units 2110, 2120, and 2130. When the basic coding order is from a left location to a right location, encoding is performed in an order of the coding unit 2110, the coding unit 2120, and the coding unit 2130. However, the encoding order may be changed according to an encoding order flag 2140 or 2150.

The encoding order flag 2140 indicates an encoding order of the coding units 2110 and 2120. When the encoding order flag 2140 is 0, the encoding order of the coding units 2110 and 2120 is determined to be a forward direction. Accordingly, the coding unit 2110 is encoded earlier than the coding unit 2120. However, when the encoding order flag 2140 is 1, the encoding order of the coding units 2110 and 2120 are determined to be a reverse direction, and thus, the coding unit 2120 is encoded earlier than the coding unit 2110.

The encoding order flag 2150 indicates an encoding order of the coding units 2120 and 2130. The encoding order flag 2150 is obtained when the encoding order flag 2140 indicates a forward direction. When the encoding order flag 2140 indicates a reverse direction, the encoding order of the coding units 2120 and 2130 is not adjacent, and thus, the encoding order flag 2150 is not obtained. When the encoding order flag 2150 is 0, the encoding order of the coding units 2120 and 2130 are determined to be a forward direction. Thus, the coding unit 2120 is encoded earlier than the coding unit 2130. However, when the encoding order flag 2150 is 1, the encoding order of the coding units 2120 and 2130 are determined to be a reverse direction, and thus, the coding unit 2130 is encoded earlier than the coding unit 2120.

According to the embodiment of FIG. 21A, there are three cases of the encoding order of the three coding units. Thus, in order to determine the encoding order, one or two encoding order flags are used.

An embodiment of FIG. 21B relates to a method of determining an encoding order based on an encoding order flag 2160 indicating a direction of an encoding order applied to three coding units.

The encoding order flag 2160 indicates whether the encoding order is a forward direction or a reverse direction. For example, when the encoding order flag 2160 is 0, the encoding order of the coding units 2110, 2120, and 2130 may be determined to be a forward direction. Thus, when the encoding order flag 2160 is 0, encoding may be performed in an order of the coding unit 2110, the coding unit 2120, and the coding unit 2130.

On the contrary, when the encoding order flag 2160 is 1, the encoding order of the coding units 2110, 2120, and 2130 may be determined to be a reverse direction. Thus, when the encoding order flag 2160 is 1, encoding may be performed in an order of the coding unit 2130, the coding unit 2120, and the coding unit 2110.

According to the embodiment of FIG. 21B, there are two cases of the encoding order of the three coding units. Thus, in order to determine the encoding order, one encoding order flag is used.

The methods of determining the encoding order used in embodiments of FIGS. 21A and 21B may be applied to four or more coding units.

The processor 1710 may identify encoding order change permission information with respect to an upper data unit of a current block. The encoding order change permission information indicates whether or not a change of an encoding order is allowed with respect to blocks included in the upper data unit of the current block. When the encoding order change permission information does not allow the change of the encoding order, all blocks of the upper data unit are decoded according to a basic encoding order. When the encoding order change permission information indicates that encoding order information with respect to a current block is encoded, the processor 1710 may obtain the encoding order information.

The encoding order change permission information may be included in a video parameter set, a sequence parameter set, a picture parameter set, a slice segment header, a CTU header, etc. Also, when there are two or more types of encoding order information, encoding order change permission information with respect to the two or more types of the encoding order information may be split and stored into different headers.

The encoding order change permission information may indicate a depth or a block size, for which the encoding order information is provided. For example, the processor 1710 may obtain the encoding order information only when a depth of a current block is included in the depth indicated by the encoding order change permission information. As another example, the processor 1710 may obtain the encoding order information only when a block size of the current block corresponds to the block size indicated by the encoding order change permission information.

When the split information indicates not to split the current block, the processor 1710 may determine a method of predicting the current block according to encoding information of the current block and whether or not peripheral blocks of the current block are decoded.

The encoding information of the current block may indicate how to predict the current block. In detail, the encoding information may indicate one prediction method from among a plurality of intra prediction modes and a plurality of inter prediction modes. In detail, an AMVR mode may be included in the current block. Thus, the processor 1710 may determine a prediction mode applied to the current block according to the encoding information of the current block.

The AMVR mode is an encoding mode in which a motion vector resolution (MVR) of the current block is determined according to relevant information of the current block. The MVR indicates a smallest unit of a motion vector. A difference motion vector is compressed according to the MVR, and thus, encoding efficiency of difference motion vector information indicating the difference motion vector may be improved.

The MVR may be determined regardless of the relevant information of the current block. However, when the MVR is determined according to the relevant information of the current block according to the AMVR mode, encoding and decoding of information about the MVR are omitted, and thus, encoding and decoding efficiencies of an image may be improved. Also, when there is a possibility that an encoding order of the current block is changed, the MVR may be determined according to the encoding order of the current block and whether or not an adjacent block of the current block is encoded, in the AMVR mode.

The processor 1710 may determine the prediction mode of the current block as an inter mode or an intra mode. Also, the processor 1710 may obtain information about a motion vector of the current block, when the prediction mode of the current block is an inter mode. Also, the processor 1710 may determine whether or not to apply the AMVR mode to the current block. Whether or not to apply the AMVR mode to the current block may be determined according to an AMVR mode flag obtained from a bitstream.

The processor 1710 may obtain, from a bitstream, prediction motion vector information indicating a prediction motion vector of a current block and difference motion vector information indicating a difference motion vector of the current block. When the AMVR mode is applied to the current block, the processor 1710 may additionally determine the MVR of the current block.

The processor 1710 may determine the prediction motion vector the current block and the MVR of the current block, according to whether or not the adjacent block of the current block is decoded and the prediction motion vector information.

The processor 1710 may determine the prediction motion vector of the current block according to the encoding order information of the current block, whether or not the adjacent block of the current block is decoded, and the prediction motion vector information of the current block. Also, the processor 1710 may determine the MVR of the current block according to the encoding order information of the current block and whether or not the adjacent block of the current block is decoded. The prediction motion vector information may indicate a type of a prediction motion vector candidate, the number of prediction motion vector candidates, and a priority order of the prediction motion vectors.

The processor 1710 may obtain MVR information indicating the MVR of the current block. The MVR information may indicate a type of an MVR, the number of MVRs, and a priority order of the MVRs. The processor 1710 may determine the MVR of the current block according to whether or not the adjacent block of the current block is decoded and the MVR information.

The processor 1710 may entropy-decode the MVR information according to context determined according to at least one of a size of the current block, an encoding order of the current block, an encoding mode of the current block, a size of the peripheral block, an encoding order of the peripheral block, and an encoding mode of the peripheral block.

The processor 1710 may determine MVR candidates available for the current block according to whether or not the adjacent block of the current block is decoded. The processor 1710 may determine the MVR of the current block from the MVR candidates, according to the MVR information.

The processor 1710 may determine prediction motion vector candidates of the current block according to whether or not the adjacent block of the current block is decoded. Also, the processor 1710 may determine the prediction motion vector of the current block from the prediction motion vector candidates, according to the prediction motion vector information.

Also, the processor 1710 may determine the prediction motion vector candidates and the MVR candidates corresponding thereto, according to whether or not the adjacent block of the current block is decoded. Also, the processor 1710 may determine an MVR candidate corresponding to the prediction motion vector candidate indicated by the prediction motion vector information as the MVR of the current block.

The processor 1710 may determine the prediction motion vector of the current block according to a size of the current block, whether or not the adjacent block of the current block is decoded, and the prediction motion vector information. The processor 1710 may determine the MVR of the current block according to a size of the current block and whether or not the adjacent block of the current block is decoded.

The processor 1710 determines the difference motion vector of the current block according to the difference motion vector information. The processor 1710 may determine the motion vector of the current block according to the prediction motion vector, the MVR, and the difference motion vector.

The processor 1710 may correct the prediction motion vector and the difference motion vector according to the MVR. In detail, the processor 1710 may determine a scaling constant based on a difference between the MVR and a minimum resolution available for the current block. Also, the processor 1710 may correct the prediction motion vector and the difference motion vector according to the scaling constant.

The scaling constant may be determined to be a binary log value of a value obtained by dividing the MVR by the minimum resolution. For example, when the MVR is a 1-pixel unit and the minimum resolution is a ¼-pixel unit, the MVR may be four times the minimum resolution. Thus, the scaling constant may be determined to be 2.

According to Equations 1 and 2 below, a method of correcting a prediction motion vector (MVP) is described. $>>$ indicates a right shift calculation and $<<$ indicates a left shift calculation. Also, k indicates a scaling constant indicating a difference between the MVR and the minimum resolution. According to Equation 1, the MVP may be rounded down according to the scaling constant. Also, according to Equation 2, the MVP may be rounded off according to the scaling constant.

$$MVP=(MVP>>k)<<k \quad \text{[Equation 1]}$$

$$MVP=((MVP+(1<<(k-1)))<<k) \quad \text{[Equation 2]}$$

According to Equations 3 and 4 below, a method of encoding a difference motion vector (MVD) via an encoding end is described. According to Equation 3, the MVD is shifted to a right side according to the scaling constant. Also, according to Equation 4, the MVD is rounded off according to the scaling constant and then is shifted to a right side.

$$MVD=MVD>>k \quad \text{[Equation 3]}$$

$$MVD=(MVD+(1<<(k-1)))<<k \quad \text{[Equation 4]}$$

According to Equation 5 below, a method, performed by a decoding end, of decoding an MVD is described. According to Equation 5, the MVD transmitted by an encoding end is shifted to a left side according to a scaling constant.

$$MVD=MVD<<k \quad \text{[Equation 5]}$$

Based on Equations 3 through 5, the MVD is compressed by the encoding end according to an MVR and the compressed MVD is reconstructed by the decoding end according to the MVR.

The processor 1710 may determine a motion vector of a current block based on the corrected MVP and the MVD. Also, the processor 1710 may reconstruct the current block according to the motion vector of the current block.

The processor 1710 may obtain MVR determination method information indicating a method of determining an MVR applied to blocks included in an upper data unit of the current block. For example, the processor 1710 may determine whether or not MVR information is obtained according to the MVR determination method information, whether or not the MVR is determined according to MVP information, whether or not the MVR is determined according to an encoding order and a block size of the current block, whether or not the MVR is determined according to whether or not an adjacent block of the current block is encoded, etc. Also, the processor 1710 may determine an MVR of the current block according to an MVR determination method indicated by the MVR determination method information.

Hereinafter, FIG. 22 illustrates an MVR in an AMVR mode.

A motion vector according to a first MVR 2210 is determined as a ¼-pixel unit. A current block may be accurately predicted using the ¼-pixel unit according to a motion vector according to the first MVR 2210. However, according to the first MVR 2210, since an MVD is encoded as a ¼-pixel unit, a volume of MVD information indicating an MVD is increased. Thus, according to the first MVR 2210, while prediction accuracy of the current block is high, encoding efficiency is low.

A motion vector according to a second MVR 2220 is determined as a ½-pixel unit. Also, a motion vector according to a third MVR 2230 is determined as a 1-pixel unit. Thus, the second MVR 2220 has a lower prediction accuracy of the current block than the first MVR 2210, but has a higher encoding efficiency than the first MVR 2210. Likewise, a third MVR 2230 has a lower prediction accuracy of the current block than the first MVR 2210 and the second MVR 2220, but a higher encoding efficiency than the first MVR 2210 and the second MVR 2220.

A motion vector according to a fourth MVR 2240 is determined as a 2-pixel unit. According to the fourth MVR 2240, the prediction accuracy of the current block is lower than the prediction accuracy of the current block of the first MVR 2210 through the third MVR 2230. However, the encoding efficiency of the current block is higher than the encoding efficiency of the current block of the first MVR 2210 through the third MVR 2230.

Although not illustrated in FIG. 22, an MVR of a 1/16 unit, an MVR of a ⅛ unit, an MVR of a 4 unit, an MVR of an 8 unit, etc. may be used in an AMVR mode. An MVR from among the MVRs described in FIG. 22 may be determined, according to an accuracy of the motion vector required according to the characteristics of the current block and an ambient environment in the AMVR mode.

Figure 23:
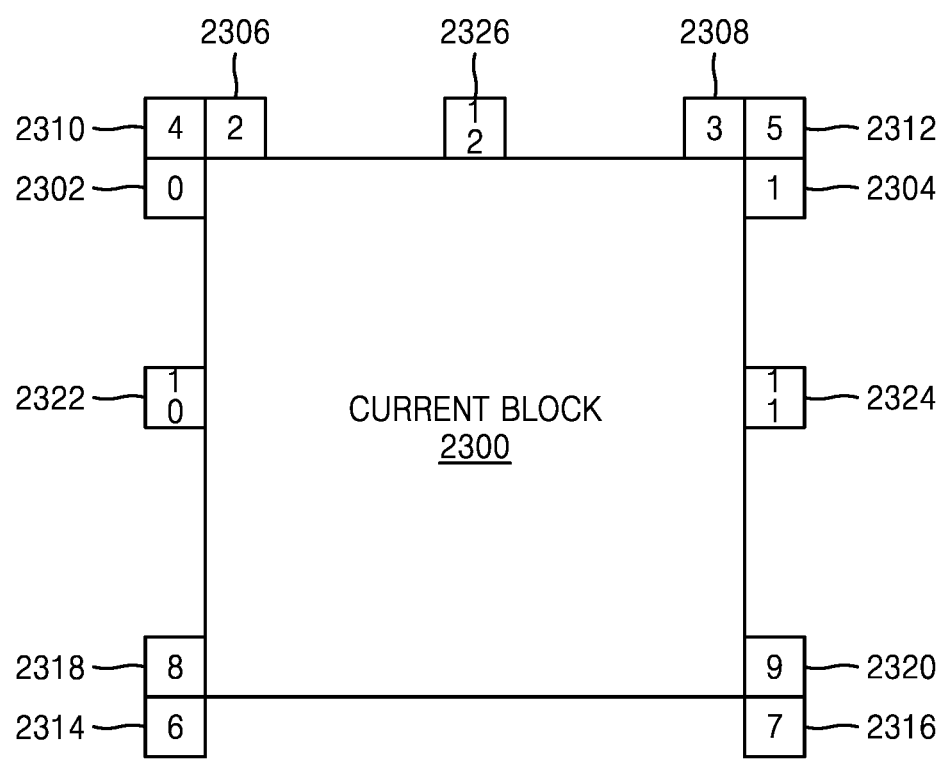
FIG. 23 illustrates a method of determining a motion vector resolution of a current block according to a location of a block adjacent to the current block, the block being referred to by the current block.

FIG. 23 describes a method of determining an MVR of a current block according to a location of an adjacent block of the current block, the adjacent block being referred to by the current block.

The processor 1710 may determine an MVR candidate corresponding to an MVP candidate, according to whether or not the adjacent block of the current block is decoded. According to an embodiment, when an MVP is determined from among MVP candidates, according to MVP information, an MVR corresponding to the MVP may be applied to the current block.

When left and right adjacent blocks of a current block 2300 are not decoded, the processor 1710 may refer to only a top left block, a top block, and a top right block with respect to the current block 2300. Here, adjacent blocks located at a second location 2306, a fifth location 2312, a third location 2308, a fourth location 2310, and a twelfth location 2326 may be sequentially determined as reference blocks of the current block 2300. Each reference block corresponds to each MVR candidate. For example, the MVR candidate corresponding to the reference block of the second location 2306 may be determined as a ¼-pixel unit. Also, the MVR candidate corresponding to the reference block of the fifth location 2312 may be determined as a ½-pixel unit. The MVR candidate corresponding to the reference block of the third location 2308 may be determined as a 1-pixel unit. The MVR candidate corresponding to the reference block of the fourth location 2310 may be determined as a 2-pixel unit. The MVR candidate corresponding to the reference block of the twelfth location 2326 may be determined as a 4-pixel unit.

When the left adjacent block of the current block 2300 is decoded and the right adjacent block of the current block 2300 is not decoded, the processor 1710 may refer to a bottom left block, a left block, a top left block, a top block, and a top right block with respect to the current block 2300. Here, adjacent blocks located at a zeroth location 2302, the second location 2306, the fifth location 2312, the fourth location 2310, and a sixth location 2314 may be sequentially determined as reference blocks of the current block 2300. Each reference block corresponds to each MVR candidate. For example, the MVR candidate corresponding to the reference block of the zeroth location 2302 may be determined as a ¼-pixel unit. Also, the MVR candidate corresponding to the reference block of the second location 2306 may be determined as a ½-pixel unit. The MVR candidate corresponding to the reference block of the fifth location 2312 may be determined as a 1-pixel unit. The MVR candidate corresponding to the reference block of the fourth location 2310 may be determined as a 2-pixel unit. The MVR candidate corresponding to the reference block of the sixth location 2314 may be determined as a 4-pixel unit.

When the right adjacent block of the current block 2300 is decoded and the left adjacent block of the current block 2300 is not decoded, the processor 1710 may refer to a bottom right block, a right block, a top left block, a top block, and a top right block with respect to the current block 2300. Here, adjacent blocks located at a first location 2304, a third location 2308, the fourth location 2310, a fifth location 2312, and a seventh location 2316 may be sequentially determined as reference blocks of the current block 2300. Each reference block corresponds to each MVR candidate. For example, the MVR candidate corresponding to the reference block of the first location 2304 may be determined as a ¼-pixel unit. Also, the MVR candidate corresponding to the reference block of the third location 2308 may be determined as a ½-pixel unit. The MVR candidate corresponding to the reference block of the fourth location 2310 may be determined as a 1-pixel unit. The MVR candidate corresponding to the reference block of the fifth location 2312 may be determined as a 2-pixel unit. The MVR candidate corresponding to the reference block of the seventh location 2316 may be determined as a 4-pixel unit.

When both of the left adjacent block and the right adjacent block of the current block 2300 are decoded, the processor 1710 may refer to a bottom left block, a left block, a bottom right block, a right block, a top left block, a top block, and a top right block with respect to the current block 2300. Here, adjacent blocks located at the zeroth location 2302, the first location 2304, the second location 2306, the fifth location 2312, and the fourth location 2308 may be sequentially determined as reference blocks of the current block 2300. Each reference block corresponds to each MVR candidate. For example, the MVR candidate corresponding to the reference block of the zeroth location 2302 may be determined as a ¼-pixel unit. Also, the MVR candidate corresponding to the reference block of the first location 2304 may be determined as a ½-pixel unit. The MVR candidate corresponding to the reference block of the second location 2306 may be determined as a 1-pixel unit. The MVR candidate corresponding to the reference block of the fifth location 2312 may be determined as a 2-pixel unit. The MVR candidate corresponding to the reference block of the fourth location 2308 may be determined as a 4-pixel unit.

The described locations that are referred to may be changed according to an embodiment. Also, the number of locations that are referred to and the order of the locations that are referred to may be changed, according to an embodiment. Also, the order of the locations that are referred to may be changed by comparing a width and a height of a current block. For example, when the width of the current block is greater than the height of the current block, the twelfth location 2326 may precede a tenth location 2322 and an eleventh location 2324. On the contrary, when the height of the current block is greater than the width of the current block, the tenth location 2322 and the eleventh location 2324 may precede the twelfth location 2326.

Also, the same MVR candidate may be assigned to a plurality of reference blocks. On the contrary, two or more MVR candidates may be assigned to one reference block. Here, an MVR of the current block may be selected according to the MVR information. Alternatively, the MVR of the current block may be selected according to a size or an encoding order of the current block.

According to the described embodiments, when a block at a location that is referred to is intra predicted or there is no block at the location that is referred to, the processor 1710 may determine a predetermined motion vector as a motion vector candidate of the current block. Also, when one or more of motion vector candidates of the current block are repeated, the processor 1710 may remove the one or more repeated motion vector candidates and may determine a motion vector generated by combining previous motion vector candidates, or a predetermined motion vector, as a new motion vector candidate.

Figure 24:
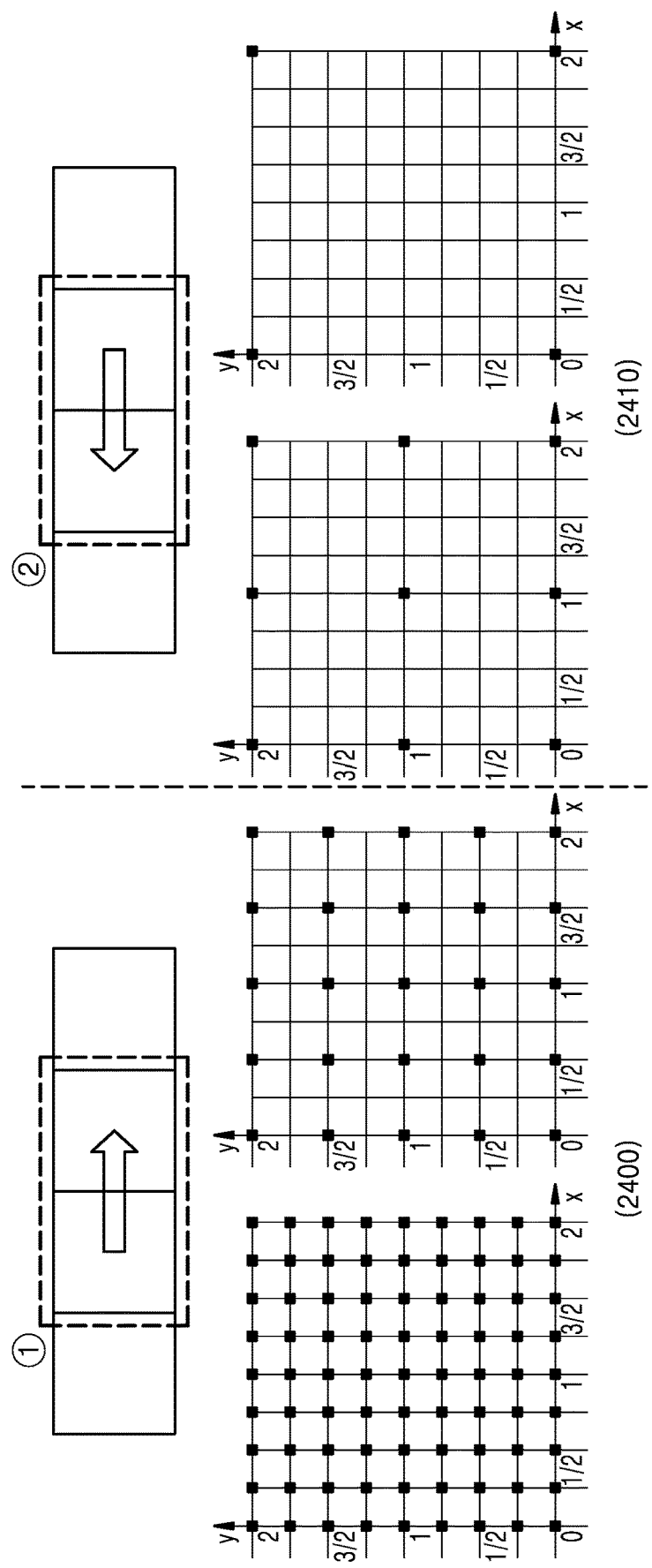
FIG. 24 illustrates a method of determining a motion vector resolution according to an encoding order.

FIG. 24 describes a method of determining an MVR according to an encoding order.

The MVR may be determined according to the encoding order. For example, an MVR when the encoding order is determined from a left location to a right location and an MVR when the encoding order is determined from the right location to the left location may be determined to be different from each other.

A plurality of blocks are decoded from the left location to the right location in a first embodiment 2400. According to the encoding order of the first embodiment 2400, only specific MVRs may be applied to determine a motion vector of the current block. For example, in the first embodiment 2400, the MVR may be determined as one of a ¼-pixel unit and a 1-pixel unit. According to an embodiment, in the first embodiment 2400, at least one of a ⅛-pixel unit through an 8-pixel unit may be used as an MVR candidate of the current block.

A plurality of blocks are decoded from a right location to a left location in a second embodiment 2410. According to the encoding order of the second embodiment 2410, only specific MVRs may be applied to determine a motion vector of the current block. For example, in the second embodiment 2410, the MVR may be determined as one of a ½-pixel unit and a 2-pixel unit. According to an embodiment, in the second embodiment 2410, at least one of a ⅛-pixel unit through an 8-pixel unit may be used as an MVR candidate of the current block.

Figure 25:
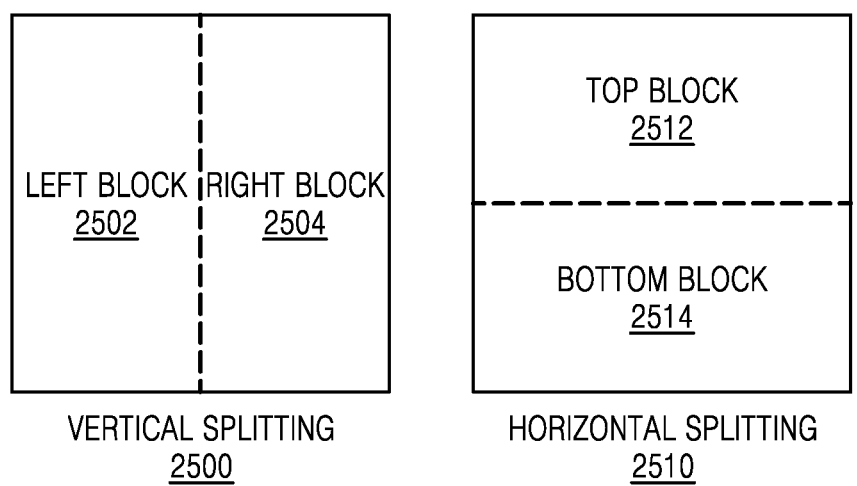
FIG. 25 describes a method of determining a motion vector resolution according to a method of splitting a block.

FIG. 25 describes a method of determining an MVR according to a method of splitting a block.

After the processor 1710 splits a current block, the processor 1710 may determine a MVP candidate and an MVR candidate used in an AMVR mode according to a width and a height of the block. For example, lower blocks 2502 and 2504 generated by vertically splitting a current block 2500 and lower blocks 2512 and 2514 generated by horizontally splitting a current block 2510 may have different methods of determining MVP candidates and different methods of determining MVR candidates from each other.

After the processor 1710 splits the current block 2500 or 2510, the processor 1710 may determine the method of determining the MVP candidate and the method of determining the MVR candidate by comparing widths and heights of the lower blocks. Thus, substantial shapes of the lower blocks 2502, 2504, 2512, and 2514 may be taken into account to determine the method of determining the MVP candidate and the method of determining the MVR candidate.

After the processor 1710 vertically splits the current block 2500, the processor 1710 determine the method of determining the MVP candidate and the method of determining the MVR candidate according to an encoding order of the lower blocks 2502 and 2504. According to an embodiment, the method of determining the MVP candidate and the method of determining the MVR candidate may be determined such that the lower blocks 2502 and 2504 do not refer to each other.

The processor 1710 may determine reference locations of the lower blocks 2502, 2504, 2512, and 2514 and an MVR according to the reference locations, according to the method of splitting the current blocks 2500 and 2510.

Figure 26:
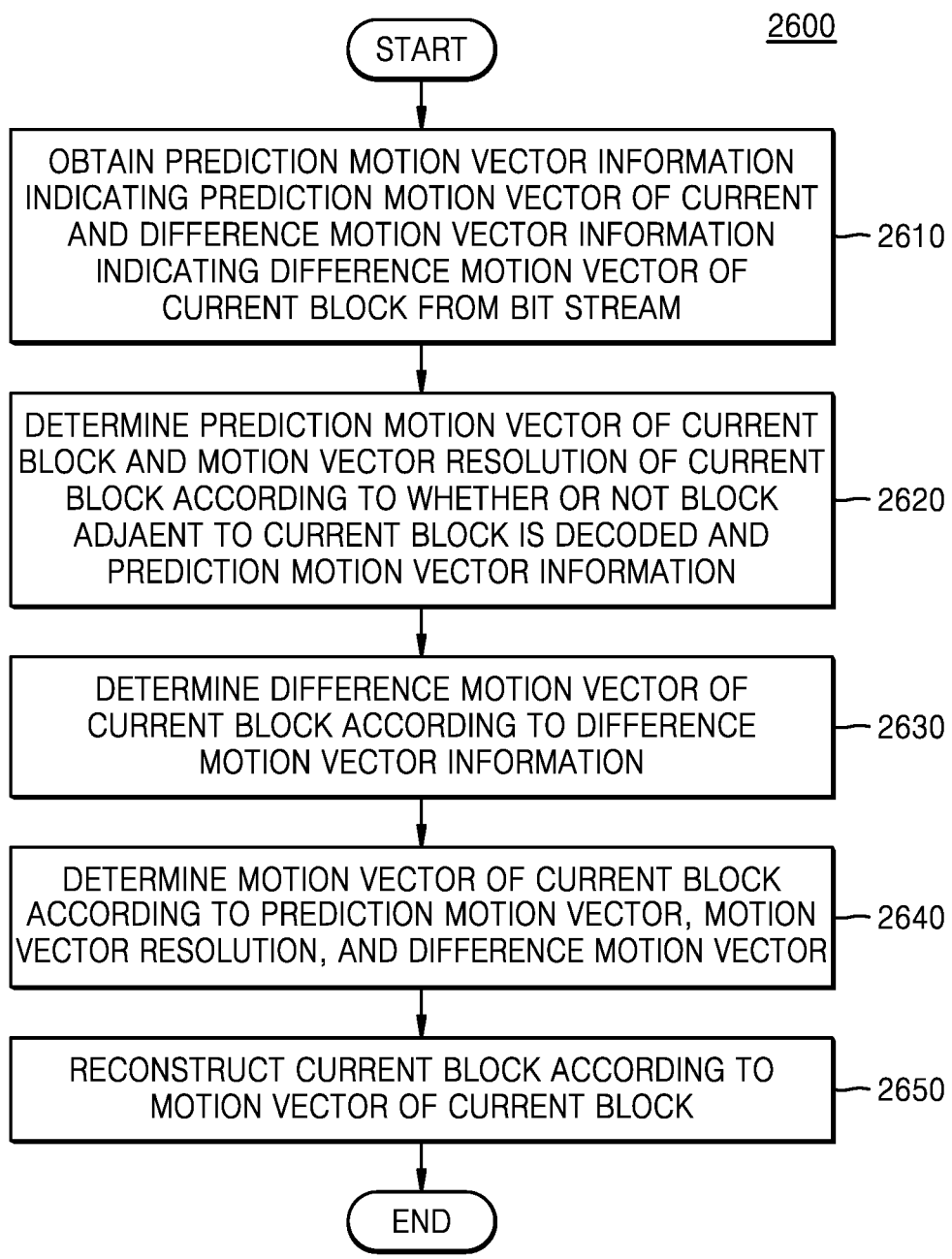
FIG. 26 illustrates a video decoding method for splitting a current block and encoding deeper split blocks, according to an embodiment.

FIG. 26 illustrates a video decoding method 2600 according to an embodiment, the method including splitting a current block and decoding split lower blocks.

In operation 2610, MVP information indicating an MVP of a current block and MVD information indicating an MVD of the current block are obtained from a bitstream.

Also, encoding order information indicating an encoding order of lower blocks of an upper block in which the current block is included, may be obtained. According to the encoding order indicated by the encoding order information, the lower blocks of the upper block including the current block may be decoded.

Also, MVR determination method information indicating a method of determining an MVR applied to blocks included in the upper data unit of the current block may be obtained. An MVR of the current block may be determined according to the method of determining the MVR indicated by the MVR determination method information.

In operation 2620, the MVP of the current block and the MVR of the current block are determined according to whether or not an adjacent block of the current block is decoded and the MVP information. The adjacent block of the current block may include a right block of the current block.

Also, according to encoding order information, whether or not the adjacent block of the current block is decoded, and the MVP information, the MVP of the current block and the MVR of the current block may be determined.

According to whether or not the adjacent block of the current block is decoded, MVP candidates of the current block may be determined. According to the MVP information, the MVP of the current block may be determined from the MVP candidates. Also, according to whether or not the adjacent block of the current block is decoded, MVR candidates corresponding to the MVP candidates may be determined. The MVR candidate corresponding to the MVP candidate indicated by the MVP information may be determined as the MVR of the current block.

According to an embodiment, the MVP information indicating the MVR of the current block may be obtained. Also, according to whether or not the adjacent block of the current block is decoded and the MVR information, the MVR of the current block may be determined. According to context determined according to at least one of a size of the current block, an encoding order of the current block, an encoding mode of the current block, a size of a peripheral block, an encoding order of the peripheral block, and an encoding mode of the peripheral block, the MVR information may be entropy-decoded.

According to whether or not the adjacent block of the current block is decoded, MVR candidates available for the current block may be determined. According to the MVR information, the MVR of the current block may be determined from the MVR candidates.

According to the size of the current block, whether or not the adjacent block of the current block is decoded, and the MVP information, the MVP of the current block and the MVR of the current block may be determined.

In operation 2630, an MVD of the current block is determined according to MVD information.

In operation 2640, according to the MVP, the MVR, and the MVD, the motion vector of the current block is determined.

According to an embodiment, the MVP and the MVD are corrected according to the MVR and the motion vector of the current block may be determined based on the corrected MVP and MVD. In detail, a scaling constant is determined based on a difference between the MVR and a minimum resolution available for the current block and the MVP and the MVD may be corrected according to the scaling constant.

In operation 2650, the current block is reconstructed according to the motion vector of the current block.

Functions of the video decoding apparatus 1700 described in FIG. 17 may be included in the video decoding method 2600.

Figure 27:
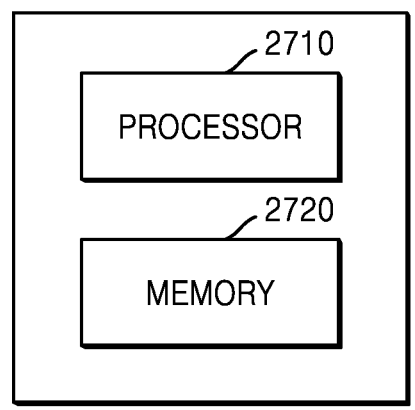
FIG. 27 illustrates a video encoding apparatus for splitting a current block and encoding deeper split blocks, according to an embodiment.

FIG. 27 illustrates a video encoding apparatus 2700 for splitting a current block and encoding lower blocks that are split, according to an embodiment.

The video encoding apparatus 2700 includes a processor 2710 and a memory 2720. In FIG. 27, the processor 2710 and the memory 2720 are illustrated components located in one apparatus. However, the processor 2710 and the memory 2720 do not necessarily have to be physically adjacent to each other. Thus, according to an embodiment, the processor 2710 and the memory 2720 may be separated from each other. In FIG. 27, the processor 2710 is illustrated as a single component. However, according to an embodiment, a plurality of processors may be included in the video encoding apparatus 2700.

The processor 2710 may split a current block into two or more lower blocks and according to a result of splitting the current block, may determine whether or not to split the current block. For example, when the encoding efficiency is good when the current block is split, the processor 2710 may determine to split the current block. When the encoding efficiency is good when the current block is not split, the processor 2710 may determine not to split the current block.

The processor 2710 may generate split information indicating whether or not to split the current block. Also, the processor 2710 may determine a method of splitting the current block according to the encoding efficiency and generate the split shape information indicating the method of splitting the current block.

The processor 2710 may determine an encoding order of lower blocks included in the current block according to the encoding efficiency according to the encoding order and may generate encoding order information indicating the encoding order of the lower blocks. The processor 2710 may improve the encoding efficiency of an image by determining the encoding order by comparing the encoding efficiency when a current coding unit is encoded in a forward direction and the encoding efficiency when the current coding unit is encoded in a reverse direction.

When the splitting of the current block is completed, the processor 2710 may determine a prediction mode with respect to a lower block of the current block. The processor 2710 may determine the prediction mode of the lower block according to the encoding efficiency of prediction modes, which may be applied to the lower block. The prediction modes applicable to the lower block may include an AMVR mode.

The processor 2710 may determine an optimum motion vector of the current block when the current block is not split. Also, the processor 2710 may determine an MVP of the current block from an adjacent block of the current block. Also, the processor 2710 may determine an MVR of the current block according to whether or not the adjacent block of the current block is decoded.

The processor 2710 may determine an MVD of the current block according to a difference between the motion vector and the MVP of the current block, and the MVR of the current block.

The processor 2710 outputs a bitstream including information about encoding of the current block. Thus, the processor 2710 may output the bitstream including MVP information indicating the MVP of the current block and MVD information indicating the MVD of the current block.

The video encoding apparatus 2700 of FIG. 27 may perform a video encoding method corresponding to the video decoding method performed by the video decoding apparatus 1700 of FIG. 17.

Figure 28:
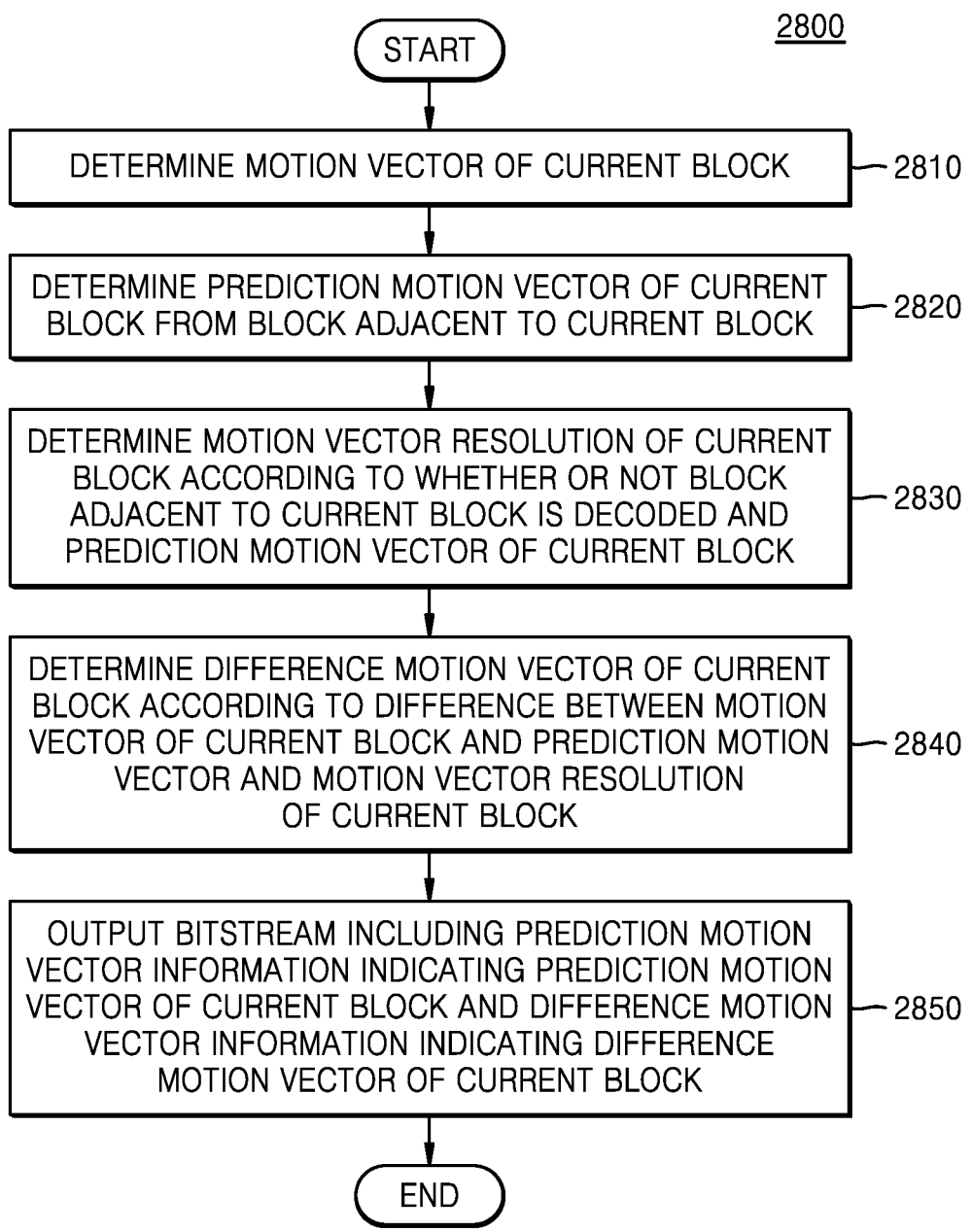
FIG. 28 illustrates a video encoding method for splitting a current block and encoding deeper split blocks, according to an embodiment.

FIG. 28 illustrates a video encoding method 2800 according to an embodiment, the method including splitting a current block and encoding split lower blocks.

In operation 2810, a motion vector of the current block is determined.

In operation 2820, an MVP of the current block is determined from an adjacent block of the current block.

In operation 2830, an MVR of the current block is determined according to whether or not the adjacent block of the current block is encoded.

In operation 2840, an MVD of the current block is determined according to a difference between the motion vector and the MVP of the current block, and the MVR of the current block.

In operation 2850, a bitstream including MVP information indicating the MVP of the current block and MVD information indicating the MVD of the current block is output.

Functions of the video encoding apparatus 2700 described in FIG. 28 may be included in the video encoding method 2800.

According to the video encoding method based on the coding units of the tree structure described above with reference to FIGS. 1 through 28, image data of a spatial domain is encoded for each coding unit having the tree structure, and according to the video decoding method based on the coding units of the tree structure, decoding is performed for each CTU, and thus, image data of a spatial domain may be reconstructed and a picture and a video, which is a sequence of pictures, may be reconstructed. The reconstructed video may be reproduced by a reproducing apparatus, stored in a storage medium, or transmitted via a network.

The embodiments of the present disclosure described in detail may be embodied as a program to be executed in a computer, and may be implemented in a general-purpose digital computer for executing the program by using a computer-readable recording medium.

Although the present disclosure is described in relation to specific best embodiments, substitutions, modifications, and corrections to the present disclosure will be apparent to one of ordinary skill in the art based on the descriptions above. That is, the scope of claims shall be interpreted to include all these substitutions, modifications, and corrections. Therefore, the descriptions in this specification and the drawings should be interpreted as non-limiting examples.

What is claimed is:

1. A video decoding method comprising:
   obtaining, from a bitstream, first encoding order information indicating a first encoding order between first lower coding blocks included in a first coding block among coding blocks hierarchically split from an upper block;
   decoding the first lower coding blocks according to the first encoding order indicated by the first encoding order information;
   obtaining, from the bitstream, second encoding order information indicating a second encoding order between second lower coding blocks included in a second coding block among the coding blocks hierarchically split from the upper block; and
   decoding the second lower coding blocks according to the second encoding order indicated by the second encoding order information,
   wherein the first encoding order between the first lower coding blocks included in the first coding block is separately determined from the second encoding order between the second lower coding blocks included in the second coding block, and the first coding block and the second coding block are included in the same upper block,
   wherein one of the first encoding order and the second encoding order is one of a forward direction and a reverse direction, the forward direction being a direction from a left block to a right block among the first lower coding blocks or the second lower coding blocks, the reverse direction being a direction from the right block to the left block among the first lower coding blocks or the second lower coding blocks, and
   wherein the decoding of the first lower coding blocks comprises:
      obtaining, from the bitstream, information regarding a resolution of a motion vector of a current coding block among the first lower coding blocks;
      determining a prediction motion vector of the current coding block using a motion vector of an adjacent block, among adjacent blocks available for inter prediction on the current coding block, based on the information regarding the resolution of the motion vector of the current coding block; and
      reconstructing the current coding block by using the prediction motion vector of the current coding block.

2. A video encoding method comprising:
   encoding first lower coding blocks included in a first coding block among coding blocks hierarchically split from an upper block, and second lower coding blocks included in a second coding block among the coding blocks hierarchically split from the upper block; and
   encoding first encoding order information indicating a first encoding order between the first lower coding blocks including in the upper block, and second encoding order information indicating a second encoding order between the second lower coding blocks included in the upper block,
   wherein the first encoding order between the first lower coding blocks included in the first coding block is separately determined from the second encoding order between the second lower coding blocks included in the second coding block, and the first coding block and the second coding block are included in the same upper block,
   wherein one of the first encoding order and the second encoding order is one of a forward direction and a reverse direction, the forward direction being a direction from a left block to a right block among the first lower coding blocks or the second lower coding blocks, the reverse direction being a direction from the right block to the left block among the first lower coding blocks or the second lower coding blocks
   wherein the encoding of the first lower coding blocks comprises:
      determining a motion vector of a current coding block among the first lower coding blocks;
      determining a motion vector of an adjacent block, among adjacent blocks available for inter prediction on the current coding block;
      determining a prediction motion vector of the current coding block using the motion vector of the adjacent block;
      encoding information regarding a resolution of the motion vector of the current coding block according to the adjacent block among the adjacent blocks available for the inter prediction on the current coding block; and
      outputting a bitstream including the information regarding the resolution of the motion vector of the current block.

3. A method of storing a bitstream into a non-transitory computer-readable storage medium, the bitstream being generated by a video encoding method of claim 2.

* * * * *